US012592746B2

(12) United States Patent
Lee et al.

(10) Patent No.: US 12,592,746 B2
(45) Date of Patent: Mar. 31, 2026

(54) CALIBRATION FOR MULTI-TRP COHERENT JOINT TRANSMISSIONS

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 18/531,535

(22) Filed: Dec. 6, 2023

(65) Prior Publication Data

US 2024/0223241 A1     Jul. 4, 2024

Related U.S. Application Data

(60) Provisional application No. 63/439,015, filed on Jan. 13, 2023, provisional application No. 63/433,351, filed on Dec. 16, 2022.

(51) Int. Cl.
H04B 7/02        (2018.01)
H04B 7/024       (2017.01)
(Continued)

(52) U.S. Cl.
CPC ........... H04B 7/024 (2013.01); H04B 7/0456 (2013.01); H04B 7/0626 (2013.01)

(58) Field of Classification Search
CPC .... H04B 7/024; H04B 7/0404; H04B 7/0456; H04B 7/0691
See application file for complete search history.

(56) References Cited

U.S. PATENT DOCUMENTS

| | | | |
|---|---|---|---|
| 11,728,856 B2 * | 8/2023 | Zhang | H04B 7/0874 |
| | | | 375/262 |
| 11,742,922 B2 * | 8/2023 | Hakola | H04B 7/0691 |
| | | | 375/267 |

(Continued)

FOREIGN PATENT DOCUMENTS

| | | |
|---|---|---|
| WO | 2021128258 A1 | 7/2021 |
| WO | 2021187967 A1 | 9/2021 |
| WO | 2022082712 A1 | 4/2022 |

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.2.0, Jun. 2022, 250 pages.

(Continued)

*Primary Examiner* — Dac V Ha

(57) ABSTRACT

Apparatuses and method for calibration for multiple transmission and reception point (multi-TRP) coherent joint transmissions. A method performed by a user equipment (UE) includes receiving configuration information about N downlink (DL) antenna port groups, N uplink (UL) antenna port groups, wherein the N DL antenna port groups are associated with the N UL antenna port groups, respectively and receiving an indicator to trigger M DL antenna port groups, where M≤N. The method further includes measuring a DL reference signal (RS) for the triggered M DL antenna port groups; determining, based on the measured DL RS, an UL precoder for each of M UL antenna port groups respectively associated with the triggered M DL antenna port groups; and transmitting, based on the UL precoder, an UL RS for the M associated UL antenna port groups.

15 Claims, 23 Drawing Sheets

(51) Int. Cl.
    *H04B 7/0456*    (2017.01)
    *H04B 7/06*    (2006.01)

(56)           References Cited

U.S. PATENT DOCUMENTS

| | | | |
|---|---|---|---|
| 2019/0181934 A1 | 6/2019 | Kang et al. | |
| 2020/0313827 A1 | 10/2020 | Noh et al. | |
| 2021/0159946 A1* | 5/2021 | Raghavan | H01Q 21/24 |
| 2021/0167829 A1 | 6/2021 | Li et al. | |
| 2022/0416856 A1* | 12/2022 | Yu | H04L 5/0051 |
| 2023/0147639 A1 | 5/2023 | Go et al. | |
| 2023/0254029 A1* | 8/2023 | Huang | H04B 7/0473 |
| | | | 370/329 |

OTHER PUBLICATIONS

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.2.0, Jun. 2022, 584 pages.

"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022, 147 pages.

"LTE; Evolved Universal Terrestrial Radio Access (E-UTRA); Radio Resource Control (RRC); Protocol specification (3GPP TS 36.331 version 17.1.0 Release 17)", ETSI TS 136 331 V17.1.0, Aug. 2022, 1135 pages.

"3rd Generation Partnership Project; Technical Specification Group Radio Access Network; NR; Physical channels and modulation (Release 17)", 3GPP TS 38.211 V17.2.0, Jun. 2022, 136 pages.

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

International Search Report and Written Opinion issued Mar. 28, 2024 regarding International Application No. PCT/KR2023/020795, 7 pages.

Supplementary European Search Report dated Jan. 27, 2026, in connection with European Application No. 23904072.8, 10 pages.

Moderator (Futurewei), "FL Summary #1 on SRS enhancements," R1-2210382, 3GPP TSG RAN WG1 Meeting #110bis-E, eMeeting, Oct. 10-19, 2022, 43 pages.

\* cited by examiner

600

700

UE

| 1 | 0 | 1 |
|---|---|---|
| DL RS resource 1 (e.g., CSI-RS) | DL RS resource 2 (e.g., CSI-RS) | DL RS resource N (e.g., CSI-RS) |
| UL RS resource 1 (e.g., SRS) | UL RS resource 2 (e.g., SRS) | UL RS resource N (e.g., SRS) |

Port group 1 of
DL RS resource
(e.g., CSI-RS)

UL RS resource 1
(e.g., SRS)

UL RS resource 2
(e.g., SRS)

Association

UL RS resource $M_1$
(e.g., SRS)

Port group N of
DL RS resource
(e.g., CSI-RS)

UL RS resource 1
(e.g., SRS)

UL RS resource 2
(e.g., SRS)

Association

UL RS resource $M_N$
(e.g., SRS)

Port group 1 of
DL RS resource
(e.g., CSI-RS)

Port group 2 of
DL RS resource
(e.g., CSI-RS)

⋮

Port group $L_1$ of
DL RS resource
(e.g., CSI-RS)

Association

UL RS resource 1
(e.g., SRS)

⋮

⋮

Port group 1 of
DL RS resource
(e.g., CSI-RS)

Port group 2 of
DL RS resource
(e.g., CSI-RS)

⋮

Port group $L_N$ of
DL RS resource
(e.g., CSI-RS)

Association

UL RS resource N
(e.g., SRS)

2600

2700

(1) DL RS reception
(2) UL RS transmission

2900

(1) UL RS transmission
(2) DL RS reception
(3) Calibration coefficient reporting

CALIBRATION FOR MULTI-TRP COHERENT JOINT TRANSMISSIONS

CROSS-REFERENCE TO RELATED AND CLAIM OF PRIORITY

The present application claims priority under 35 U.S.C. § 119(e) to: U.S. Provisional Patent Application No. 63/433,351 filed on Dec. 16, 2022, and U.S. Provisional Patent Application No. 63/439,015 filed on Jan. 13, 2023, which are hereby incorporated by reference in their entirety.

TECHNICAL FIELD

The present disclosure relates generally to wireless communication systems and, more specifically, the present disclosure is related to apparatuses and methods for calibration for multiple transmission and reception point (multi-TRP) coherent joint transmissions.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to calibration for multi-TRP coherent joint transmissions.

In one embodiment, a user equipment (UE) is provided. The UE includes a transceiver configured to receive configuration information about N downlink (DL) antenna port groups, N uplink (UL) antenna port groups, wherein the N DL antenna port groups are associated with the N UL antenna port groups, respectively, and an indicator to trigger M DL antenna port groups, where M≤N. The UE further includes a processor operably coupled to the transceiver. The processor is configured to measure a DL reference signal (RS) for the triggered M DL antenna port groups and determine, based on the measured DL RS, an UL precoder for each of M UL antenna port groups respectively associated with the triggered M DL antenna port groups. The transceiver is further configured to transmit, based on the UL precoder, an UL RS for the M associated UL antenna port groups.

In another embodiment, a base station (BS) is provided. The BS includes a transceiver configured to transmit configuration information about N DL antenna port groups, N UL antenna port groups, wherein the N DL antenna port groups are associated with the N UL antenna port groups, respectively; transmit an indicator to trigger M DL antenna port groups, where M≤ N; transmit a DL RS for the triggered M DL antenna port groups; and receive an UL RS for M UL antenna port groups that are respectively associated with the triggered M DL antenna port groups. An UL precoder for the UL RS is based on the DL RS for the triggered M DL antenna port groups.

In yet another embodiment, a method performed by a UE is provided. The method includes receiving configuration information about N DL antenna port groups, N UL antenna port groups, wherein the N DL antenna port groups are associated with the N UL antenna port groups, respectively and receiving an indicator to trigger M DL antenna port groups, where M≤N. The method further includes measuring a DL RS for the triggered M DL antenna port groups; determining, based on the measured DL RS, an UL precoder for each of M UL antenna port groups respectively associated with the triggered M DL antenna port groups; and transmitting, based on the UL precoder, an UL RS for the M associated UL antenna port groups.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
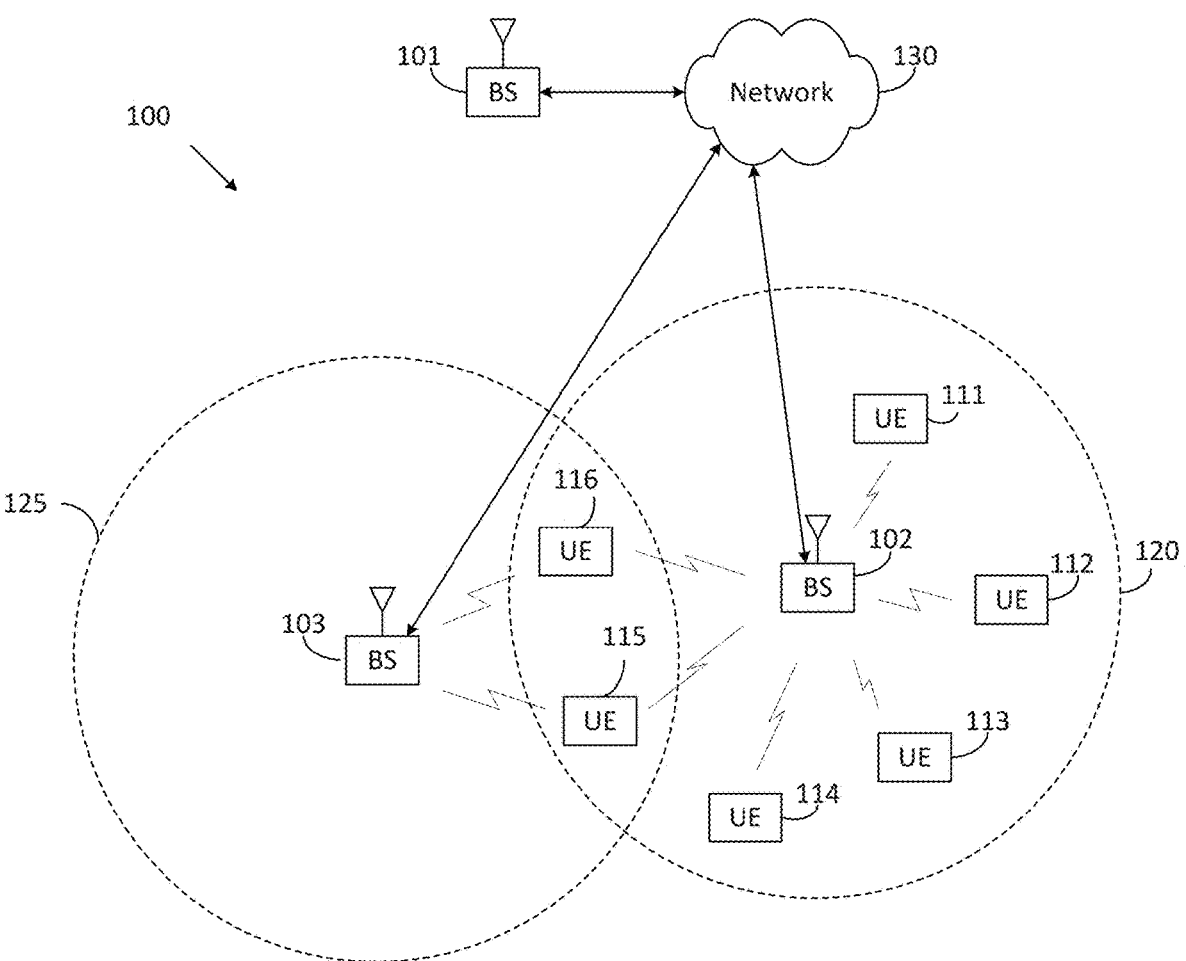
FIG. 1 illustrates an example wireless network according to embodiments of the present disclosure.

FIGS. 1-29, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 36.211 v17.2.0, "E-UTRA, Physical channels and modulation;" [2] 3GPP TS 36.212 v17.1.0, "E-UTRA, Multiplexing and Channel coding;" [3] 3GPP TS 36.213 v17.2.0, "E-UTRA, Physical Layer Procedures;" [4] 3GPP TS 36.321 v17.1.0, "E-UTRA, Medium Access Control (MAC) protocol specification;" [5] 3GPP TS 36.331 v17.1.0, "E-UTRA, Radio Resource Control (RRC) Protocol Specification;" [6] 3GPP TS 38.211 v17.2.0, "NR, Physical channels and modulation;" [7] 3GPP TS 38.212 v17.2.0, "NR, Multiplexing and Channel coding;" [8] 3GPP TS 38.213 v17.2.0, "NR, Physical Layer Procedures for Control;" [9] 3GPP TS 38.214 v17.2.0, "NR, Physical Layer Procedures for Data;" [10] 3GPP TS 38.215 v17.1.0, "NR, Physical Layer Measurements;" 3GPP TS 38.321 v17.1.0, "NR, Medium Access Control (MAC) protocol specification;" and 3GPP TS 38.331 v17.1.0, "NR, Radio Resource Control (RRC) Protocol Specification."

Figure 2:
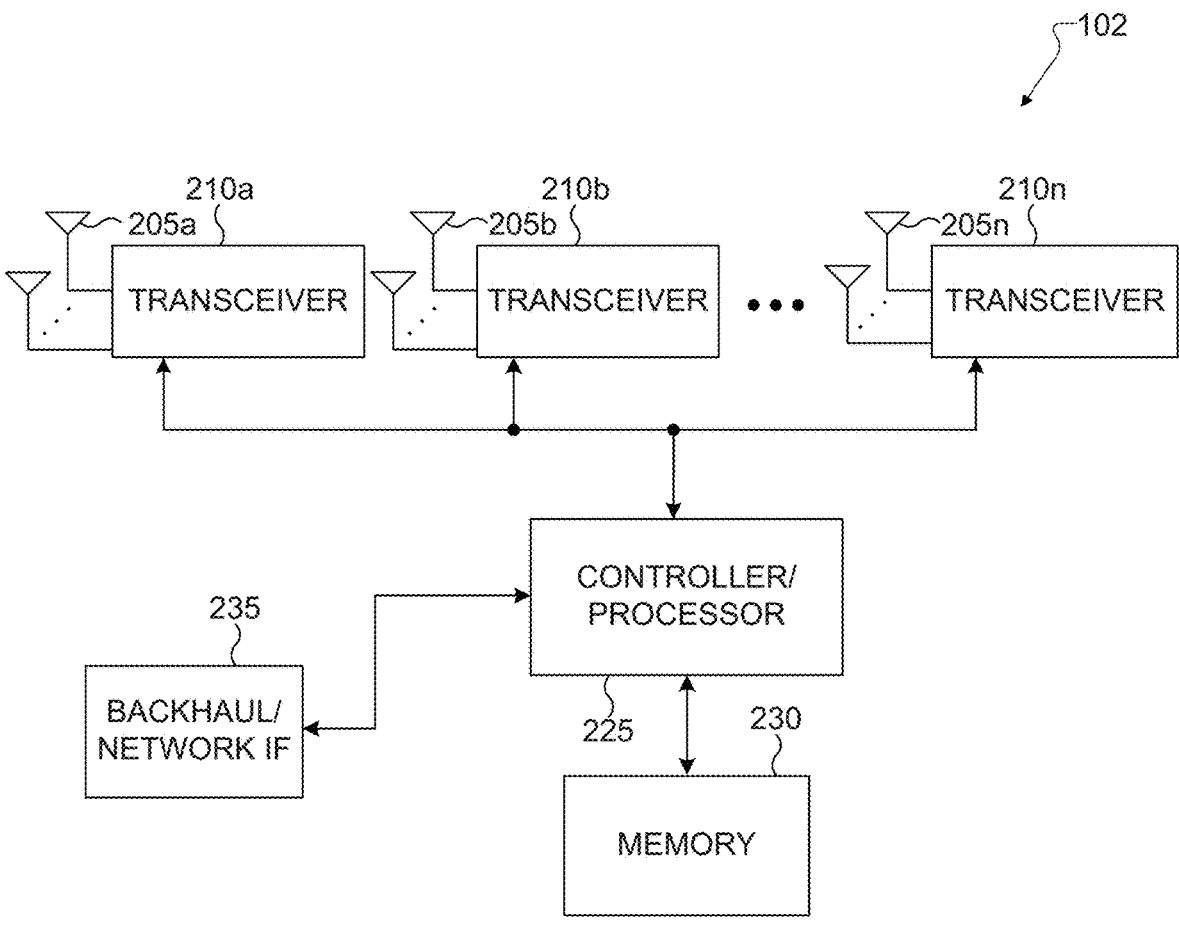
FIG. 2 illustrates an example gNodeB (gNB) according to embodiments of the present disclosure.
Figure 3:
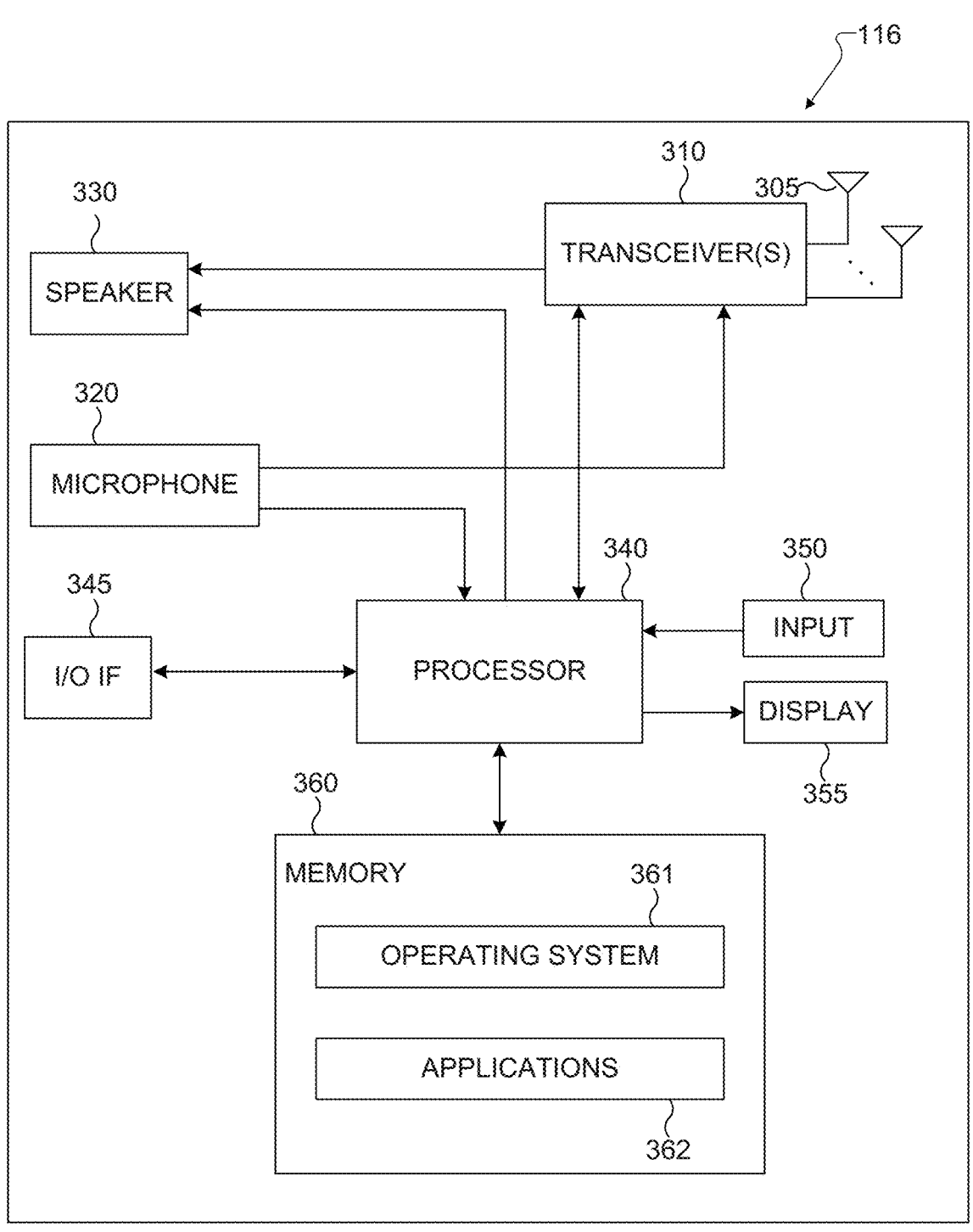
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing and/or assisting in calibration for multi-TRP coherent joint transmission. In certain embodiments, one or more of the BSs 101-103 include circuitry, programing, or a combination thereof for performing and/or assisting in calibration for multi-TRP coherent joint transmission.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for calibration for multi-TRP coherent joint transmission. Any of a wide variety of other functions could be supported in the gNB 102 by the controller/processor 225.

The controller/processor 225 is also capable of executing programs and other processes resident in the memory 230, such as processes to provide calibration for multi-TRP coherent joint transmission. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for performing and/or assisting in calibration for multi-TRP coherent joint transmission as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
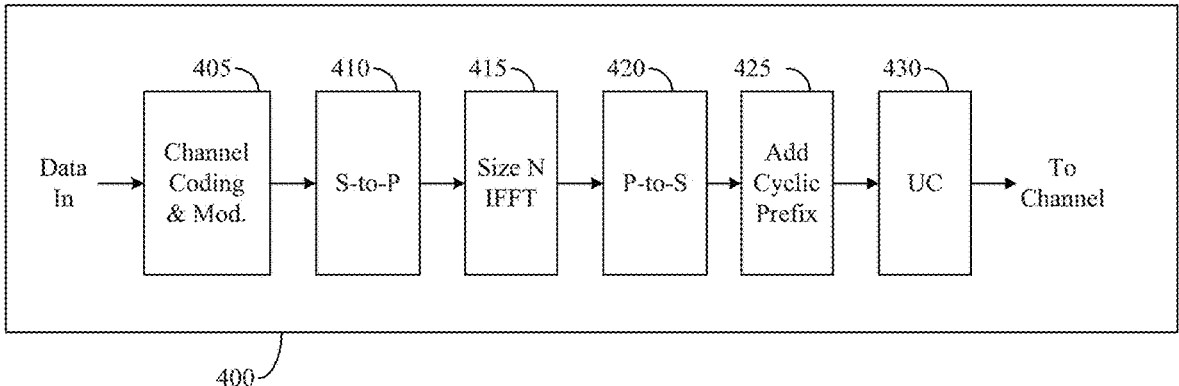
FIGS. 4A and 4B illustrate an example of a wireless transmit and receive paths according to embodiments of the present disclosure.
Figure 4B:
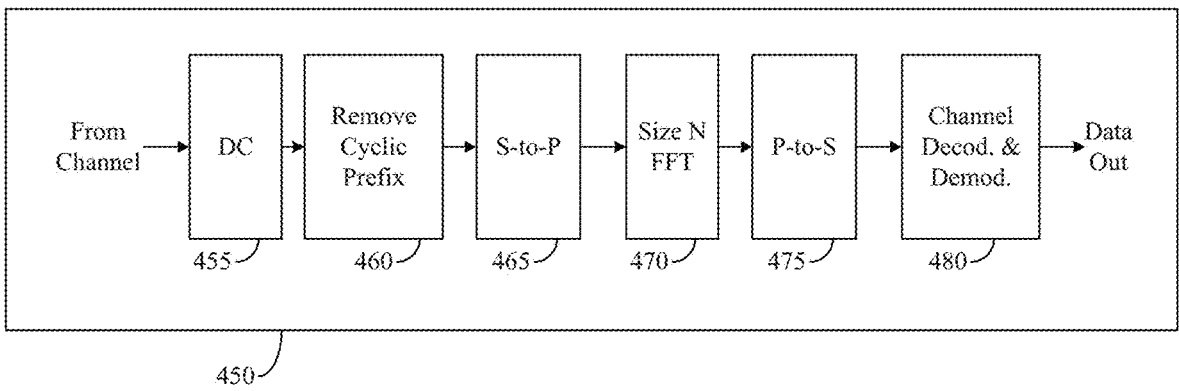

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured for calibration for multi-TRP coherent joint transmission as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
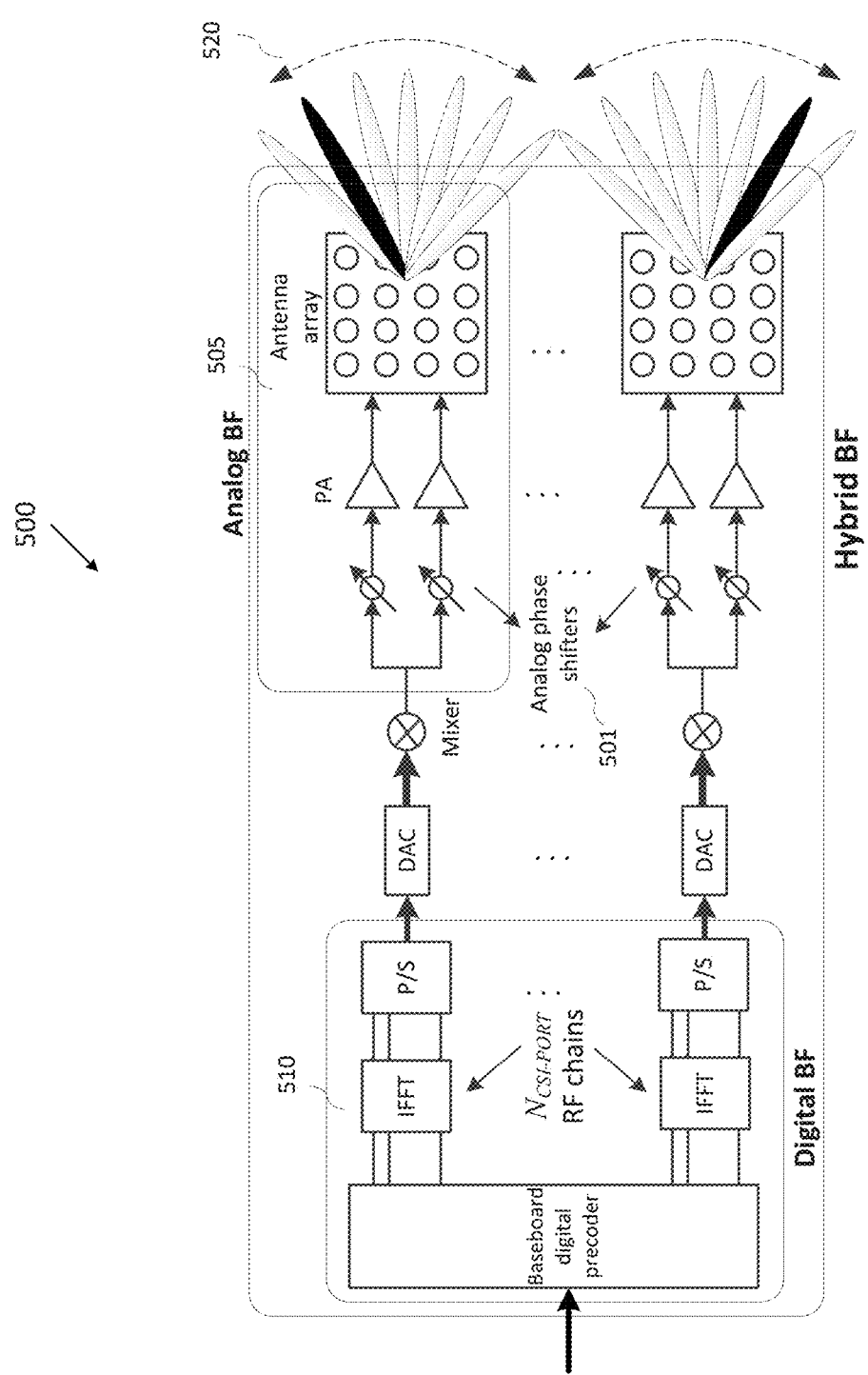
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 channel state information reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports NCSI-PORT. A digital beamforming unit 510 performs a linear combination across NCSI-PORT analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are necessary to compensate for the additional path loss.

Embodiments of the present disclosure recognize for a cellular system operating in a sub-1 GHz frequency range (e.g., less than 1 GHz), supporting large number of CSI-RS antenna ports (e.g. 32) at a single location or remote radio head (RRH) or TRP is challenging due to that a larger antenna form factor size is necessary at these frequencies than a system operating at a higher frequency such as 2 GHz or 4 GHz. At such low frequencies, the maximum number of CSI-RS antenna ports that can be co-located at a single site (or TRP/RRH) can be limited, for example to 8. This limits the spectral efficiency of such systems. In particular, the multiuser MIMO (MU-MIMO) spatial multiplexing gains offered due to large number of CSI-RS antenna ports (such as 32) can't be achieved.

One way to operate a sub-1 GHz system with large number of CSI-RS antenna ports is based on distributing antenna ports at multiple locations (or TRP/RRHs). The multiple sites or TRPs/RRHs can still be connected to a single (common) base unit, hence the signal transmitted/received via multiple distributed TRPs/RRHs can still be processed at a centralized location. This is called distributed MIMO or multi-TRP coherent joint transmission (C-JT).

Figure 6:
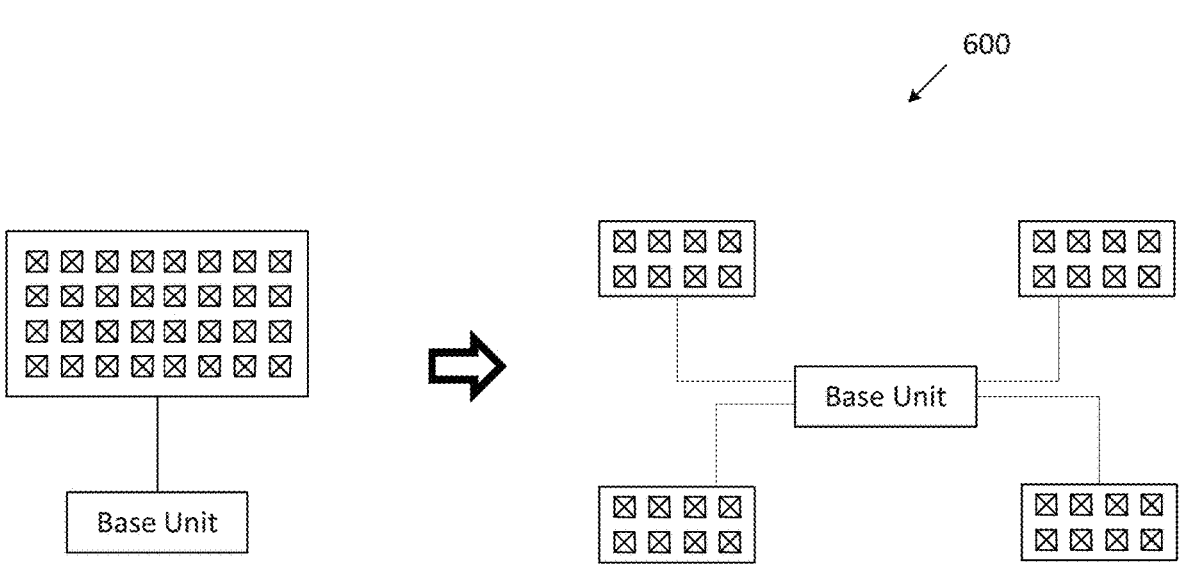
FIG. 6 illustrates an example of a distributed multiple input multiple output (MIMO) according to embodiments of the present disclosure.

FIG. 6 illustrates an example of a distributed MIMO communication system 600 according to various embodiments of the present disclosure. For example, the distributed MIMO 600 forms multiple antenna panels, such as antenna modules or RRHs, with a small number of antenna ports instead of integrating each of the antenna ports in a single panel or at a single site and distributing the multiple panels in multiple locations/sites or RRHs. For example, the distributed MIMO communication system 600 may be implemented by one or more BSs such as BS 102. This example is for illustration only and other embodiments can be used without departing from the scope of the present disclosure.

At lower frequency bands such as <1 GHz, on the other hand, the number of antenna elements may not be large in a given form factor due to the large wavelength. As an example, for the case of the wavelength size ($\lambda$) of the center frequency 600 MHz (which is 50 cm), it desires 4 m for uniform-linear-array (ULA) antenna panel of 16 antenna elements with the half-wavelength distance between two adjacent antenna elements. Regarding a plurality of antenna elements mapped to one digital port in practical cases, the desirable size for antenna panel(s) at gNB to support a large number of antenna ports such as 32 CSI-RS ports becomes very large in such low frequency bands, and it leads the difficulty of deploying 2-D antenna element arrays within the size of a common form factor. This results in a limited number of CSI-RS ports that can be supported at a single site and limits the spectral efficiency of such systems.

One possible approach to resolving the issue is to form multiple TRPs (multi-TRP) or RRHs with a small number of antenna ports instead of integrating each of the antenna ports in a single panel (or at a single site) and to distribute the multiple panels in multiple locations/sites (or TRPs, RRHs).

Figure 7:
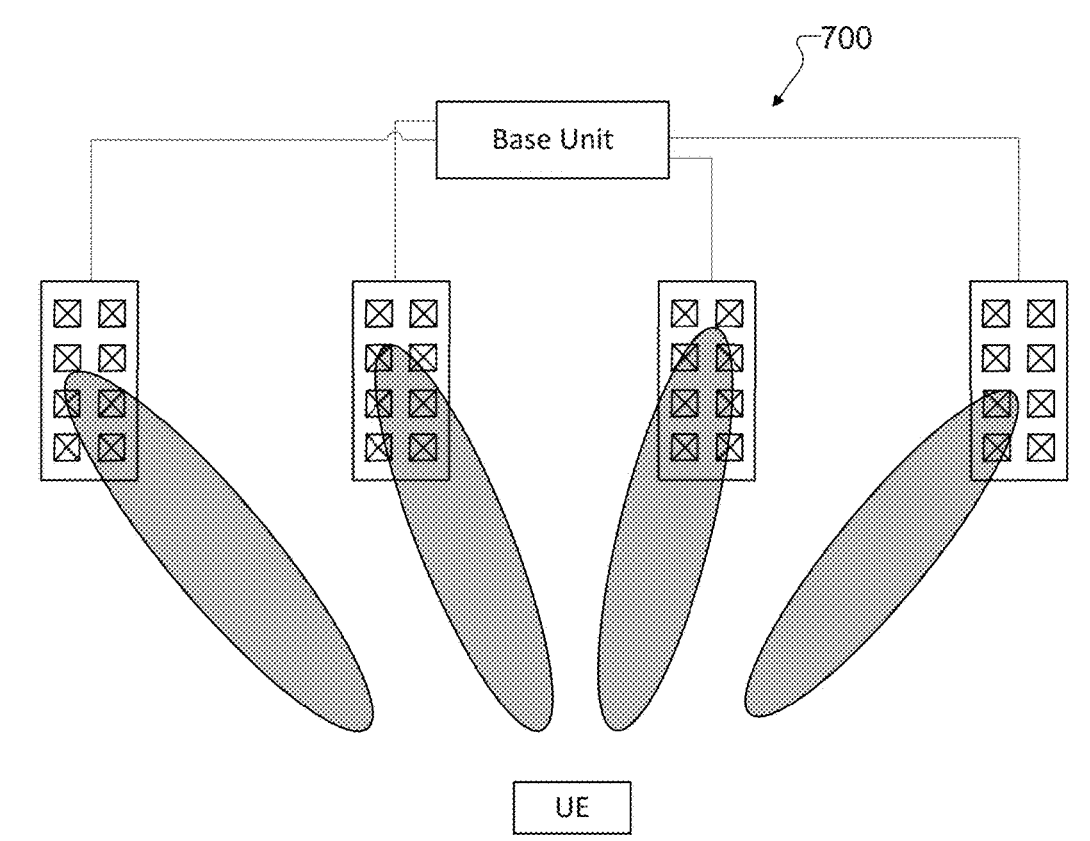
FIG. 7 illustrates an example of a distributed multiple input multiple output (D-MIMO) according to embodiments of the present disclosure.

FIG. 7 illustrates another example of a D-MIMO communication system 700 according to various embodiments of the present disclosure. For example, the D-MIMO communication system 700 may be implemented by one or more BSs such as BS 102. This example is for illustration only and other embodiments can be used without departing from the scope of the present disclosure.

The multiple TRPs at multiple locations can still be connected to a single base unit, and thus the signal transmitted/received via multiple distributed TRPs can be processed in a centralized manner through the single base unit.

Note that although we have mentioned low frequency band systems (sub-1 GHz band) as a motivation for distributed MIMO (or mTRP), the distributed MIMO technology is frequency-band-agnostic and can be useful in mid-(sub-6 GHZ) and high-band (above-6 GHz) systems in addition to low-band (sub-1 GHz) systems.

The terminology "distributed MIMO" is used as an illustrative purpose, it can be under other terminology such as multi-TRP, mTRP, cell-free network, and so on.

Each of the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, each of the following components and embodiments are applicable for UL transmission when the scheduling unit in time is either one subframe (which can include one or multiple slots) or one slot.

In time division duplex (TDD), a common approach to acquire DL channel state information is to exploit UL channel estimation through receiving UL RSs (e.g., sounding reference signal (SRS)) sent from UE. By using the channel reciprocity in TDD systems, the UL channel estimation itself can be used to infer DL channels. This favorable feature enables NW/gNB to reduce the training overhead significantly. However, due to the RF impairment at transmitter and receiver, directly using the UL channels to infer the DL channels may not be accurate and it requires a calibration process (periodically) among receive and transmit antenna ports of the RF network at NW. In general, the NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via low-power RS transmission and reception from/to the RF antenna network and thus it can be done by the NW's implementation in a confined manner (i.e., that does not interfere with other entities). However, it becomes difficult to perform the on-board calibration in distributed MIMO systems due to the distribution of the panels/RRHs over a wide region and the resulting spatial separation and different operating conditions of the multiple TRPs. Thus, it will require over-the-air (OTA) signaling mechanisms to calibrate receive/transmit antenna ports among multiple RRHs/panels/TRPs far away in distributed MIMO. The present disclosure proposes UE-assisted calibration mechanisms for distributed MIMO systems that account for the spatial separation and varying propagation environments.

Although low-band TDD systems are exemplified for motivation purposes, the present disclosure can be applied to any frequency band in FR1/FR2 and/or frequency division duplex (FDD) systems. Also, we mainly use terminology 'TRP' for a unit of entity to be calibrated in the present disclosure, but it should not be limited to TRP. It can be RRH, (antenna) panel, (antenna) module, antenna port/element, etc.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI or calibration coefficient reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI or calibration coefficient reporting band" is used only as an example for representing a function. Other terms such as "CSI or calibration coefficient reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE 116 can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for each of the Mn subbands within the CSI reporting band. A CSI parameter is configured with "subband" for the CSI reporting band with Mn subbands when one CSI parameter is reported for each of the Mn subbands within the CSI reporting band.

In one example, a TRP or RRH can be functionally equivalent to (hence can be replaced with) one of more of the following: an antenna, or an antenna group (multiple antennae), an antenna port, an antenna port group (multiple ports), a CSI-RS resource, multiple CSI-RS resources, a CSI-RS resource set, multiple CSI-RS resource sets, an antenna panel, multiple antenna panels, a Tx-Rx entity, a (analog) beam, a (analog) beam group, a cell, a cell group.

In one example, CSI-RS comprises at least one or a combination of the following: CSI-RS for tracking, CSI-RS for CSI, CSI-RS for beam management (BM), CSI-RS for mobility.

In one embodiment, a UE is configured with a calibration mechanism, wherein the UE 116 is configured to perform one or more DL RS (e.g., CSI-RS) reception(s)/measurement, and/or to perform one or more UL RS (e.g., SRS) transmission(s) (e.g., for calibration among multiple TRPs). The multiple TRPs can be associated with one base station (gNB)/cell or with more than one base stations (gNBs)/cells. This configuration can be performed via higher-layer (RRC) signaling. In one example, DL RS reception(s)/measurement(s) and/or UL RS transmission(s) can be dynamically or aperiodically triggered via L1 or L2 signaling (physical downlink control channel (PDCCH)/downlink control information (DCI) or medium access control (MAC)-control element (CE)). In one example, DL RS reception(s)/measurement(s) and/or UL RS transmission(s) can be semi-persistently or periodically performed via PDCCH or MAC-CE or RRC signaling. In one example, DL RS can be CSI-RS, DL demodulation reference signal (DMRS) or a TRS or a dedicated DL RS (for calibration purpose). In one example UL RS can be SRS or UL DMRS or a dedicated UL RS (for calibration purpose).

Figure 8:
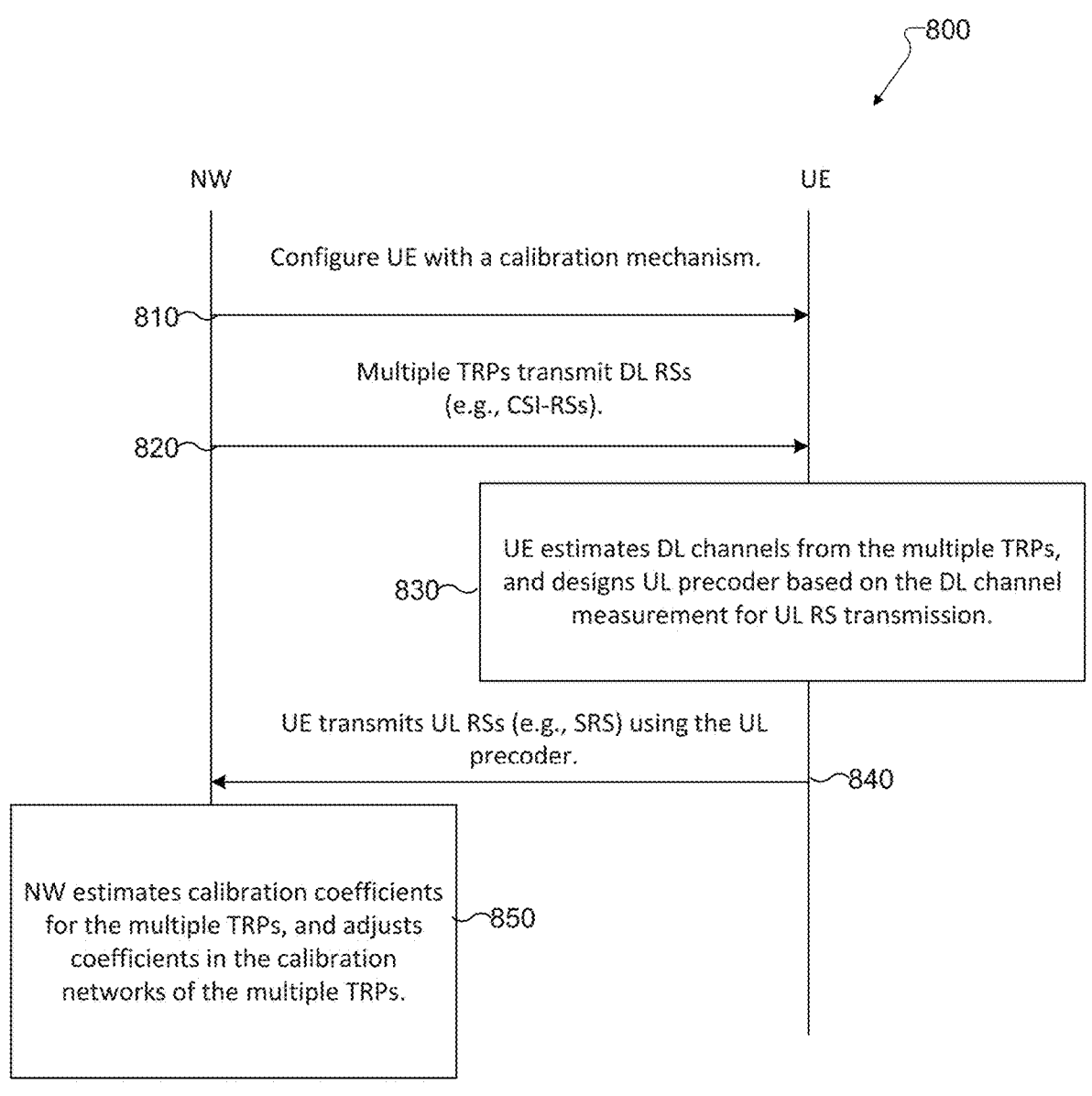
FIG. 8 illustrates a flowchart of an example process of signal flow without any reporting according to embodiments of the present disclosure.

FIG. 8 illustrates a flowchart of an example process 800 of signal flow without any reporting according to embodiments of the present disclosure. For example, process 800 can be performed by the UE 116 and the gNB 102 and/or the network 130 in the wireless network 100 of FIG. 1. This example is for illustration only and other embodiments can be used without departing from the scope of the present disclosure.

The process begins in 810, the NW 130 configures the UE 116 with a calibration mechanism. In 820, the network 130 and/or multiple TRPs transmits to the UE 116 DL RSs. In 830, the UE 116 estimates DL channels from the network 130 and/or multiple TRPs and designs the UL precoder based on the DL channel measurement for UL RS transmission. In 840, the UE 116 transmits UL RSs using the UL precoder to the network 130 and/or multiple TRPs. In 850, the network 130 estimates calibration coefficients for the multiple TRPs and adjusts coefficients in the calibration network of the multiple TRPs.

The two steps depicted in the flow diagram (the reception/ measurement of DL RSs and the transmission of UL RSs) can be configured or activated jointly. In one example, either one of the two steps can be configured or activated separately. In one example, each of the two steps can be configured or activated separately. For instance, the UE 116 can be configured or triggered (in case of semi-persistent and aperiodic SRS) to transmit SRS separately (as it normally is).

In one example, the term 'precoder' in the present disclosure can be replaced with a spatial information (or transmission configuration indication (TCI) state, or spatial-RelationInfo) or source RS or spatial filter, beamformer, beamforming vectors/matrices, precoding vector/matrices, or any other functionally equivalent quantity that can be used for UL RS transmission.

The configuration of the DL RS(s) (e.g., CSI-RS) can have no restriction or at least one of the following restrictions:

In one example, only 1-port DL RS can be configured.

In one example, only TRS (CSI-RS for tracking) can be configured.

In one example, only periodic DL-RS can be configured.

In one example, higher density (e.g., 3 REs per port) DL RS for CSI can be configured.

In one example, one slot DL RS measurement can be configured.

In one example, a measurement window (multiple slots) of DL RS measurement can be configured: SP (semi-persistent) CSI-RS or CSI-RS with repetition ON or multiple aperiodic CSI-RS with different offsets (e.g., uniformly separated).

In one example, the latest slot with DL RS(s) from the slot for UL RS transmissions can be configured or pre-determined or fixed.

In one example, there is a minimum time gap (delay) K, e.g., in slots or number of OFDM symbols between the DL RS measurement and UL RS transmission. This is to allow the UE 116 to compute necessary information for UL RS transmission. For example, $K=1, 2, \ldots$. In another example, $K=7, 14, \ldots$.

The configuration of the UL RS(s) (e.g., SRS) can have no restriction or at least one of the following restrictions.

In one example, only 1-port UL RS can be configured.

In one example, only periodic UL-RS can be configured.

In one example, higher density (e.g., 3 REs per port) UL RS for SRS can be configured.

In one example, one slot UL RS transmission can be configured.

In one example, a measurement window (multiple slots) of UL RS transmission can be configured: SP (semi-persistent) SRS or SRS with repetition ON or multiple aperiodic SRS with different offsets (e.g., uniformly separated).

In one example, the latest slot with UL RS transmission from the slot for DL RS measurements can be configured or pre-determined or fixed.

In one example, there is a minimum time gap (delay) K, e.g., in slots or number of OFDM symbols between the UL RS transmission and DL RS measurement. This is to allow the UE 116 to compute necessary information for UL RS transmission. For example, $K=1, 2, \ldots$. In another example, $K=7, 14, \ldots$.

In one embodiment, L DL RS (e.g., CSI-RS) resources are associated/linked with M UL RS (e.g., SRS) resources for the calibration mechanism, where $L\geq1$ and $M\geq1$. Here, 'association' or 'linkage' between DL RS resource(s) and UL RS resource(s) refers at least one of the following examples:

In one example, the precoder (of UE) for the transmission of UL RS resource is determined based on the measurement of an associated DL RS resource with the UL RS resource.

In one example, the precoder (of UE) for the transmission of UL RS resource is determined based on the measurement of associated DL RS resources with the UL RS resource.

In one example, the precoder (of gNB) for the transmission of DL RS resource is determined based on the measurement of an associated UL RS resource with the DL RS resource.

In one example, the precoder (of gNB) for the transmission of DL RS resource is determined based on the measurement of associated UL RS resources with the DL RS resource.

Figure 9:
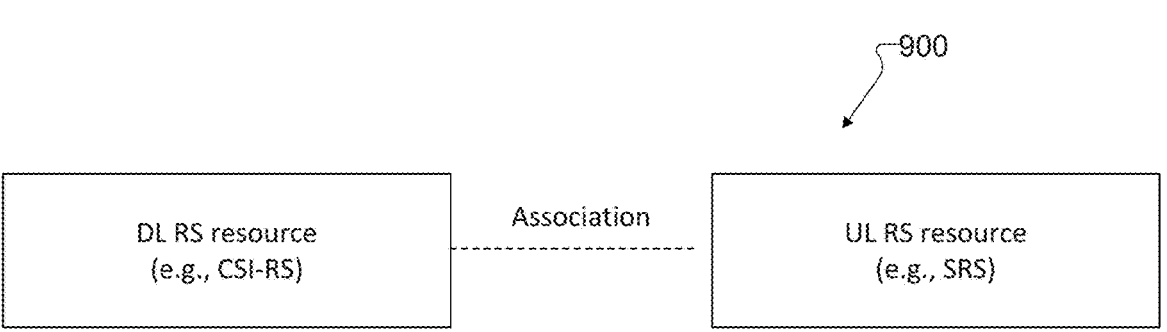
FIG. 9 illustrates a diagram of one downlink (DL) reference signal (RS) associated to one uplink (UL) RS according to embodiments of the present disclosure.

FIG. 9 illustrates a diagram 900 of one DL RS associated to one UL RS according to embodiments of the present disclosure. For example, in diagram 900 the DL RS can be received by the UE 116 of FIG. 3 and the UL RS can be received by the gNB 102 of FIG. 1. This example is for illustration only and other embodiments can be used without departing from the scope of the present disclosure.

In one example, (one-to-one association) one DL RS resource is associated with one UL RS resource (e.g., for a calibration mechanism). We call the association 'one-to-one RS association' for convenience in the present disclosure but should not be limited to the terminology.

Figure 10:
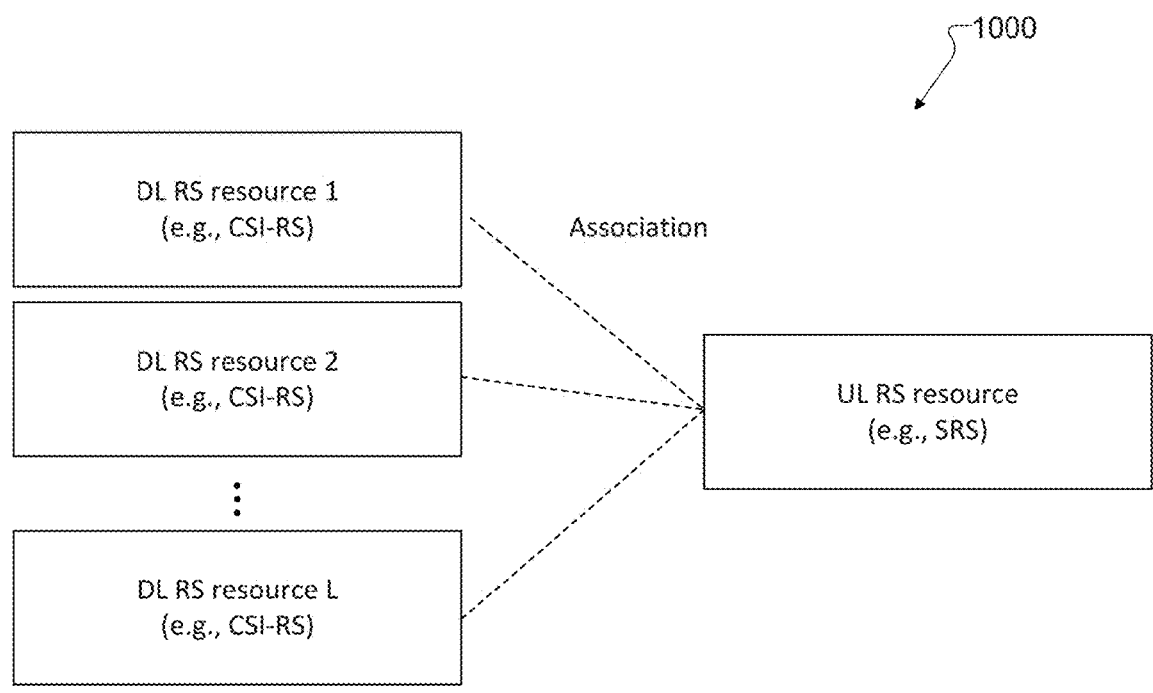
FIG. 10 illustrates a diagram of many DL RSs associated to one UL RS according to embodiments of the present disclosure.

FIG. 10 illustrates a diagram 1000 of many DL RSs associated to one UL RS according to embodiments of the present disclosure. For example, in diagram 1000 the DL RS can be received by the UE 116 of FIG. 3 and the UL RS can be received by the gNB 102 of FIG. 1. This example is for illustration only and other embodiments can be used without departing from the scope of the present disclosure.

In one example, (many-to-one association) $L>1$ DL RS resources are associated with one UL RS resource (e.g., for a calibration mechanism). We call the association 'many-to-one RS association' for convenience in the present disclosure but should not be limited to the terminology.

Figures 11, 12:
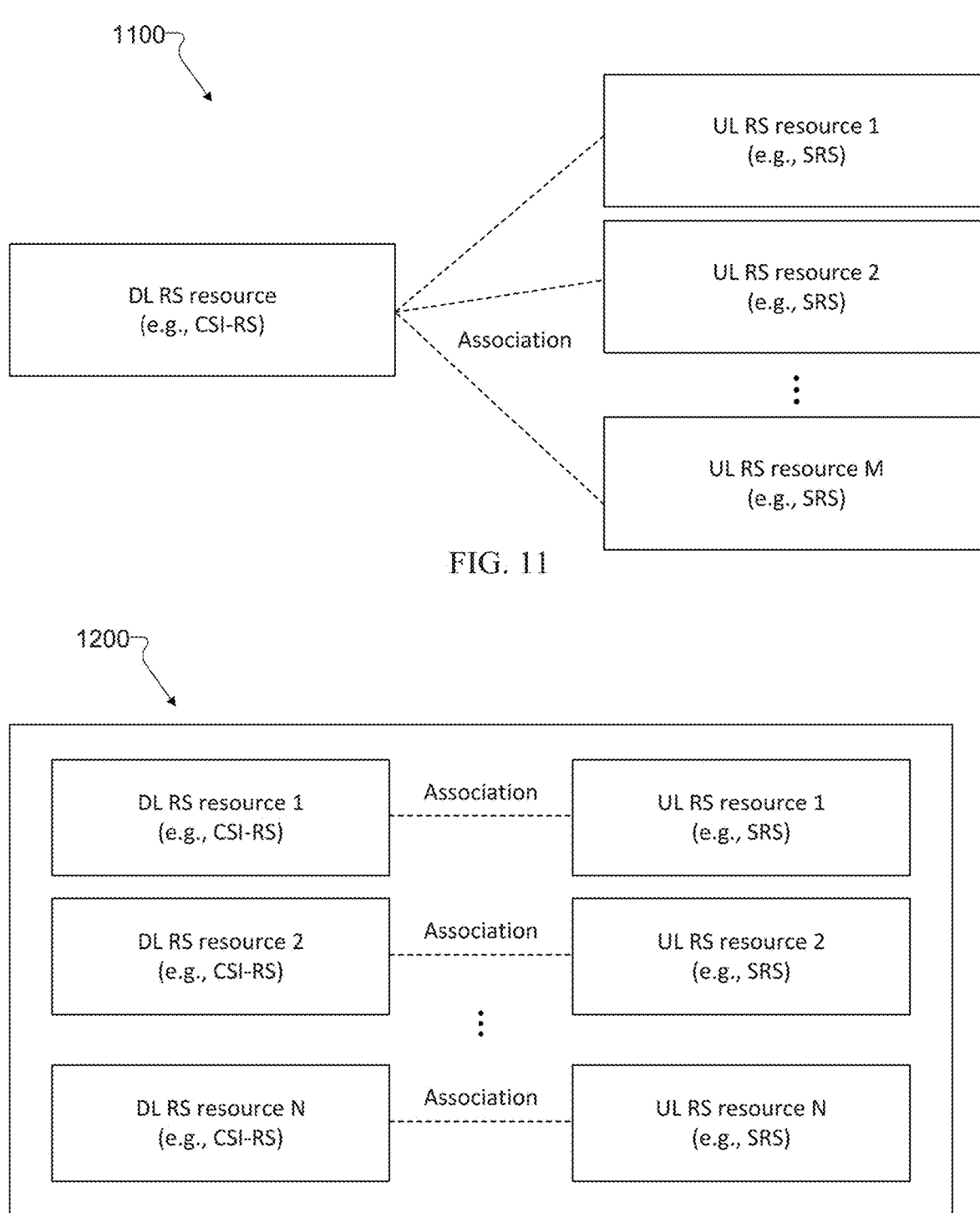
FIG. 11 illustrates a diagram of one DL RS associated to many UL RSs according to embodiments of the present disclosure.
FIG. 12 illustrates a diagram of a plurality of one DL RS associated to one UL RS according to embodiments of the present disclosure.

FIG. 11 illustrates a diagram 1100 of one DL RS associated to many UL RSs according to embodiments of the present disclosure. For example, in diagram 1100 the DL RS can be received by the UE 116 of FIG. 3 and the UL RS can be received by the gNB 102 of FIG. 1. This example is for illustration only and other embodiments can be used without departing from the scope of the present disclosure.

In one example, (one-to-many association) one DL RS resource is associated with $M>1$ UL RS resources (e.g., for a calibration mechanism). We call the association 'one-to-many RS association' for convenience in the present disclosure but should not be limited to the terminology.

In one embodiment, any combination of one or multiple associations each of which is either one-to-one, many-to-one, or one-to-many association according to one or more embodiments described herein can be configured via higher-layer (e.g., RRC) parameter (e.g., for a calibration mechanism).

In one example, a supported configuration can be subject to UE capability (i.e., the UE 116 reports the information about the association types or combinations of multiple associations that it can support).

FIG. 12 illustrates a diagram 1200 of a plurality of one DL RS associated to one UL RS according to embodiments of the present disclosure. For example, in diagram 1200 the DL RS can be received by the UE 116 of FIG. 3 and the UL RS can be received by the gNB 102 of FIG. 1. This example is for illustration only and other embodiments can be used without departing from the scope of the present disclosure.

In one example, N one-to-one RS associations can be configured (e.g., for a calibration mechanism). For example, the N one-to-one RS associations can be shown in the following figure.

Figure 13:
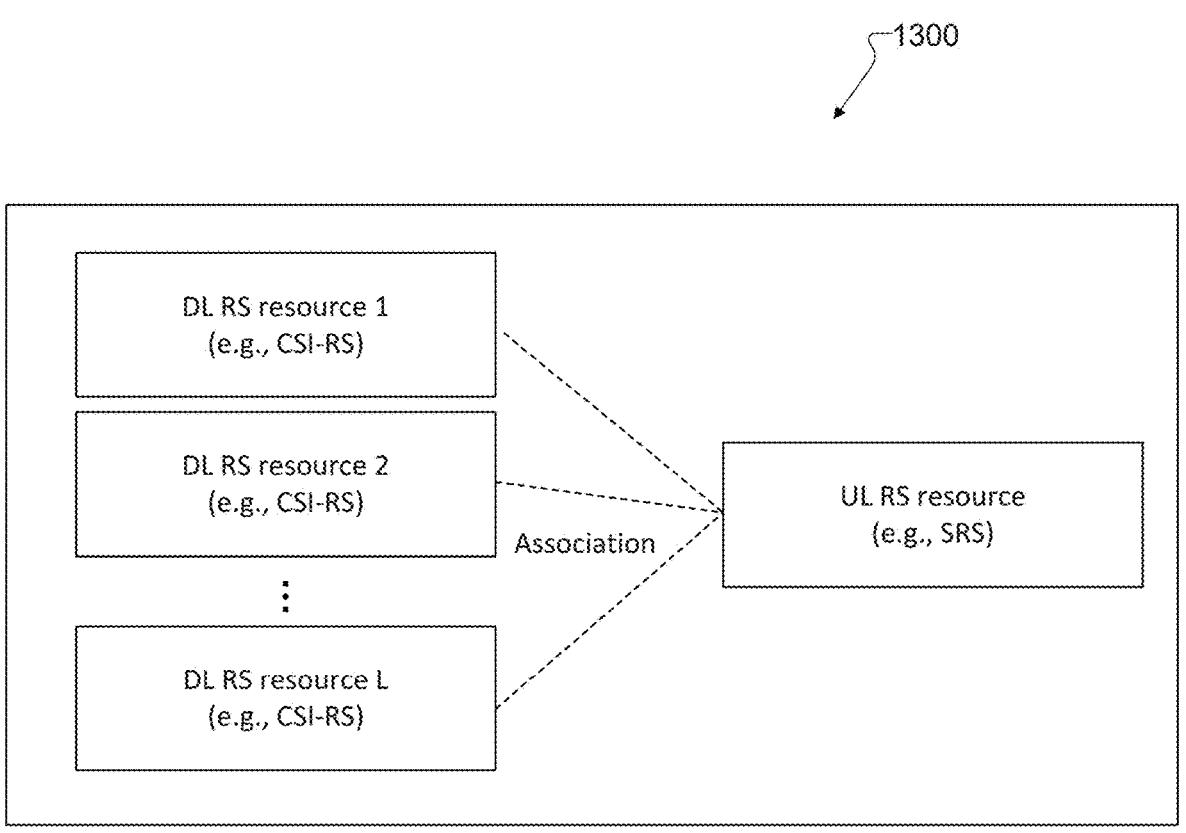
FIG. 13 illustrates a diagram of a plurality of DL RSs associated to one UL RS according to embodiments of the present disclosure.

FIG. 13 illustrates a diagram 1300 of a plurality of DL RSs associated to one UL RS according to embodiments of the present disclosure. For example, in diagram 1300 the DL RS can be received by the UE 116 of FIG. 3 and the UL RS can be received by the gNB 102 of FIG. 1. This example is for illustration only and other embodiments can be used without departing from the scope of the present disclosure.

In one example, 1 many-to-one RS association can be configured (e.g., for a calibration mechanism).

Figure 14:
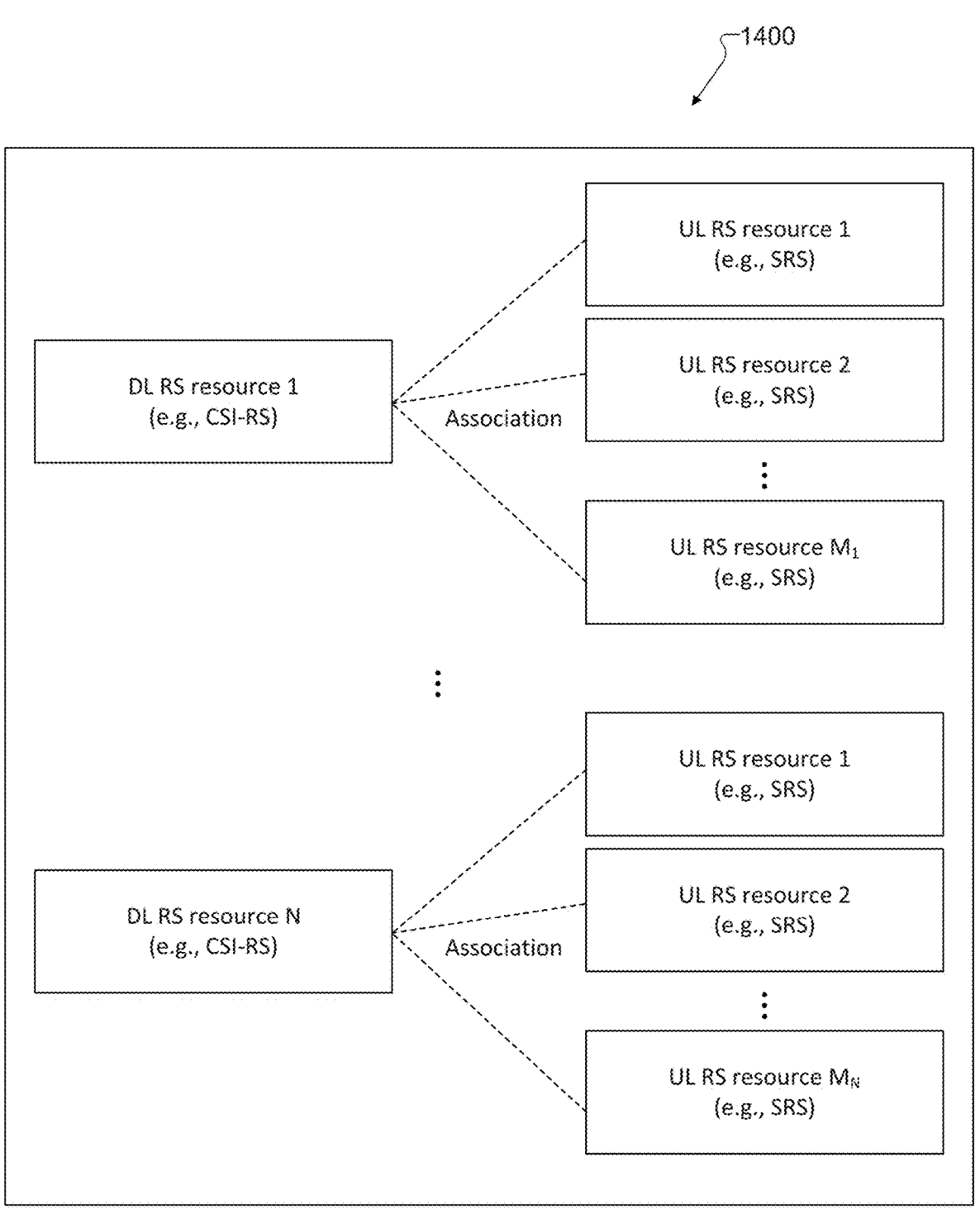
FIG. 14 illustrates a diagram of a plurality of one DL RS associated to many UL RSs according to embodiments of the present disclosure.

FIG. 14 illustrates a diagram 1400 of a plurality of one DL RS associated to many UL RSs according to embodiments of the present disclosure. For example, in diagram 1400 the DL RS can be received by the UE 116 of FIG. 3 and the UL RS can be received by the gNB 102 of FIG. 1. This example is for illustration only and other embodiments can be used without departing from the scope of the present disclosure.

In one example, N one-to-many RS associations can be configured (e.g., for a calibration mechanism).

Figure 15:
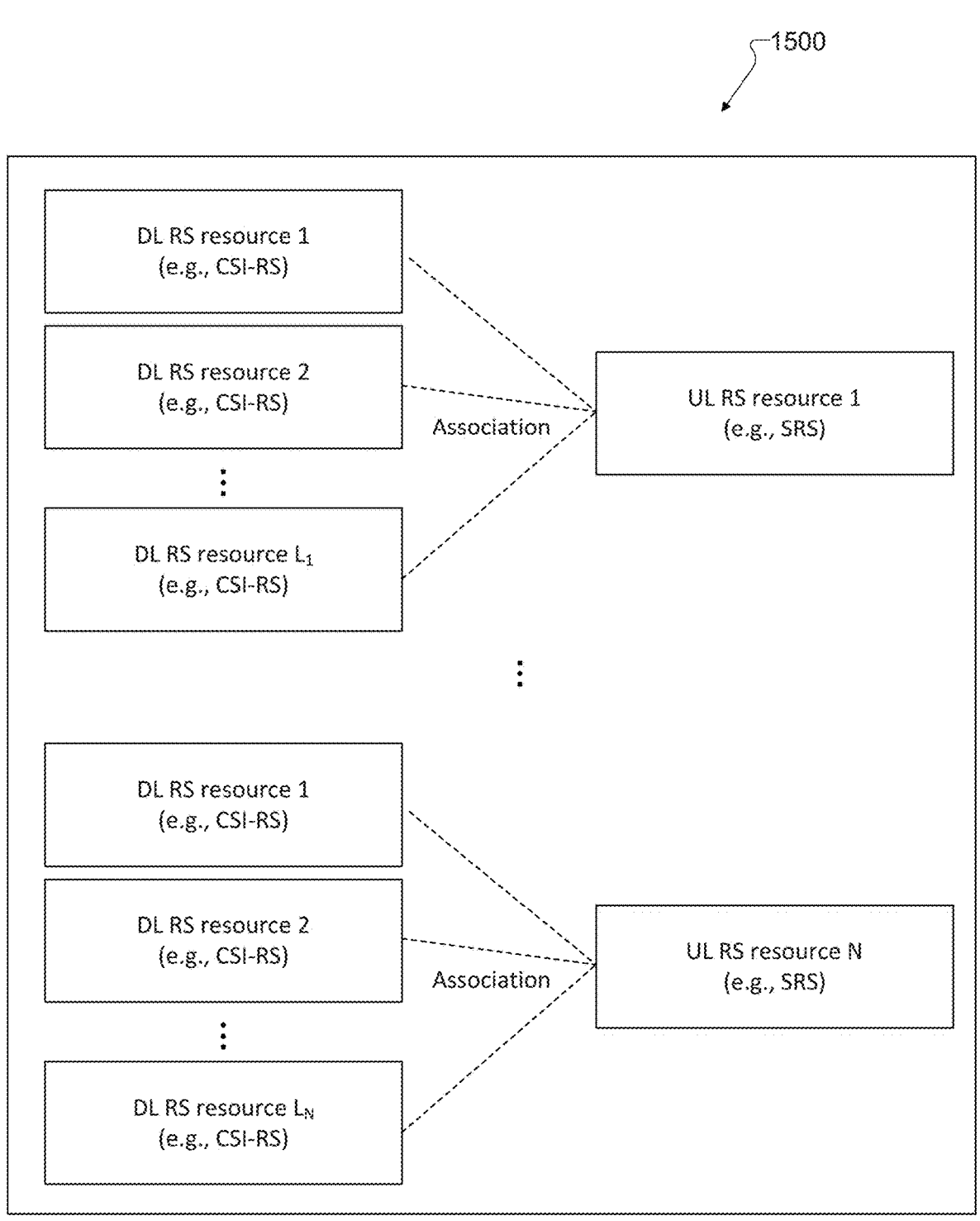
FIG. 15 illustrates a diagram of a plurality of DL RSs associated to one UL RS according to embodiments of the present disclosure.

FIG. 15 illustrates a diagram 1500 of a plurality of DL RSs associated to one UL RS according to embodiments of the present disclosure. For example, in diagram 1500 the DL RS can be received by the UE 116 of FIG. 3 and the UL RS can be received by the gNB 102 of FIG. 1. This example is for illustration only and other embodiments can be used without departing from the scope of the present disclosure.

In one example, N many-to-one RS associations can be configured (e.g., for a calibration mechanism).

Figure 16:
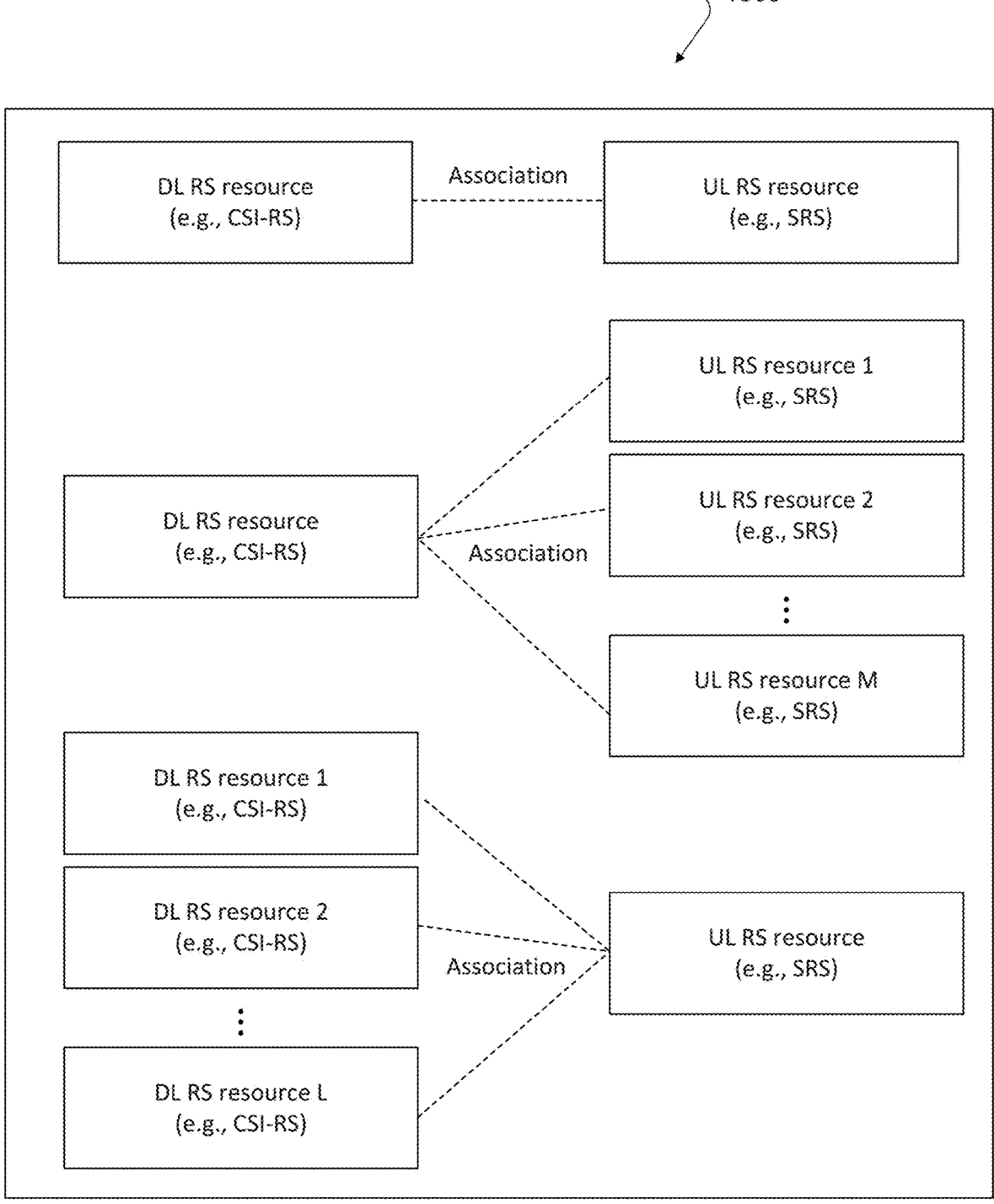
FIG. 16 illustrates a diagram of a one-to one association, a one-to-many associations, and a many-to-one associations according to embodiments of the present disclosure.

FIG. 16 illustrates a diagram 1600 of a one-to one association, a one-to-many associations, and a many-to-one associations according to embodiments of the present disclosure. For example, in diagram 1600 the DL RS can be received by the UE 116 of FIG. 3 and the UL RS can be received by the gNB 102 of FIG. 1. This example is for illustration only and other embodiments can be used without departing from the scope of the present disclosure.

In one example, $N_1$ one-to-one RS associations, $N_2$ one-to-many RS associations, and $N_3$ many-to-one RS associations can be configured (e.g., for a calibration mechanism), where $N_1 \geq 0$, $N_2 \geq 0$, $N_3 \geq 0$ and $(N_1, N_2, N_3) \neq (0,0,0)$. With reference to FIG. 16, the case of $(N_1, N_2, N_3) = (1,1,1)$ is shown.

In one example, a combination of one or more one-to-one RS associations and one or more many-to-one RS associations can be configured (e.g., for a calibration mechanism).

In one example, a combination of one or more one-to-one RS associations and one or more one-to-many RS associations can be configured (e.g., for a calibration mechanism).

In one example, a combination of one or more many-to-one RS associations and one or more one-to-many RS associations can be configured (e.g., for a calibration mechanism).

In one example, a combination of one or more one-to-one RS associations, one or more many-to-one RS associations, and one or more one-to-many RS associations can be configured (e.g., for a calibration mechanism).

In one embodiment, the higher-layer parameter usage of a configured set of UL RSs, (e.g., SRS resource set) for a calibration mechanism can be set to a new use-case terminology, for example, it could be 'tddCjt', 'tddCalib', 'cjt-Calib', 'calibration', 'none', etc.

In one embodiment, the higher-layer parameter usage of a configured set of UL RSs, (e.g., SRS resource set) for a calibration mechanism can be set to an existing use case.

In one example, the higher-layer parameter usage can be set to 'nonCodebook'.

In one example, the higher-layer parameter usage can be set to 'codebook'.

In one example, the higher-layer parameter usage can be set to 'antennaSwitching'.

In one example, the higher-layer parameter usage can be set to 'beamManagement'.

In one embodiment, an association according to one or more embodiments described herein can be provided by an existing higher-layer parameter.

In one example, a higher-layer parameter spatialRelation-Info of a SRS resource (or SRS resource set or multiple SRS resources) provides the association with the corresponding DL RS(s) (e.g., CSI-RS).

In one example, a higher-layer parameter associatedCSI-RS for SRS resource set (or a SRS resource or multiple SRS resources) provides the association with the corresponding DL RS(s) (e.g., CSI-RS).

In one example, a higher-layer parameter qclInfo or tciState of a CSI-RS resource (or CSI-RS resource set or multiple CSI-RS resources) provides the association with the corresponding UL RS(s) (e.g., SRS).

In one example, a higher-layer parameter associatedSRS for CSI-RS resource set (or a CSI-RS resource or multiple CSI-RS resources) provides the association with the corresponding UL RS(s) (e.g., SRS).

In one embodiment, a UE can be triggered/indicated/configured, via DCI or MAC-CE or RRC, to perform DL RS receptions/measurements and/or UL RS transmissions for calibration, where DL RS(s) and UL RS(s) are associated/configured in a way according to one or more embodiments described herein. In addition, either each or some (a subset) of the configured DL RS(s)/UL RS(s) associations can be triggered to perform DL RS receptions/measurement(s) and/or UL RS transmissions for the calibration. This triggering can be a DCI field in a DCI (DL-DCI or UL-DCI or a dedicated DCI). In one example, the DCI field can be 'calibration request' or 'CSI request'. In one example, the DCI field is an existing DCI field, and a codepoint of the field is used for triggering the association(s). Optionally, the triggering can be via a MAC CE, or MAC CE+DCI. The MAC CE can be used to activate/select a subset of the RRC configured associations and DCI can trigger the association(s) from the activate subset.

In one example, the UE 116 can be triggered/indicated/configured to jointly perform DL RS receptions and UL RS transmissions, i.e., the UE 116 measures the configured DL RSs and (subsequently) performs UL RS transmissions wherein the precoder for the transmission of each UL RS is determined (e.g., matched filter precoder) based on the measurement of an associated DL RS(s).

In one example, the UE 116 can be triggered/indicated/configured to (separately) either perform DL RS receptions or UL RS transmissions. For example, an associated DL RS (or associated DL RSs) is indicated via UL RS request field (e.g., SRS request field) in DCI (e.g., DCI format 0_1, 1_1, 0_2, 1_2) and the UE 116 shall perform UL RS transmission wherein the precoder for the transmission of UL RS is determined based on the measurement of the associated DL RS (or the associated DL RSs).

Figures 17, 18:
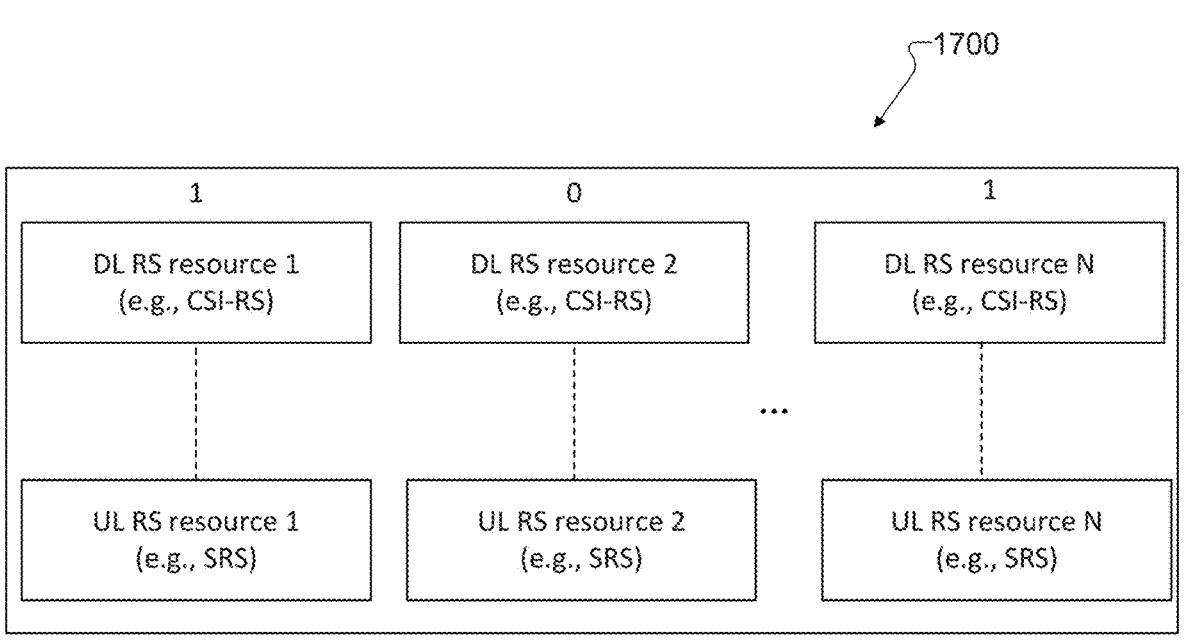
FIG. 17 illustrates a diagram of a bitmap indicator to trigger/indicate a subset of a plurality of DL RSs associated to UL RSs according to embodiments of the present disclosure.
FIG. 18 illustrates a diagram of one port group (PG) associated to one UL RS according to embodiments of the present disclosure.

FIG. 17 illustrates a diagram 1700 of a bitmap indicator to trigger/indicate a subset of a plurality of DL RSs associated to UL RSs according to embodiments of the present disclosure. For example, diagram 1700 may be utilized by the UE 116 of FIG. 3. This example is for illustration only and other embodiments can be used without departing from the scope of the present disclosure.

In one example, an N-bit bitmap indicator can be used to trigger each or some of N configured DL RS(s)/UL RS(s) associations to perform DL RS receptions and/or UL RS transmissions for the calibration. For example, i-th bit of the bitmap indicator indicates i-th association being whether triggered ('1') or not ('0').

In one example, the N-bit bitmap indicator can be used to perform UL RS transmissions corresponding to triggered DL RSs/UL RSs associations.

In one example, the N-bit bitmap indicator can be used to perform DL RS receptions and UL RS transmissions corresponding to triggered DL RSs/UL RSs associations.

In one example, the N-bit bitmap indicator can be conveyed via DCI.

In one example, the N-bit bitmap indicator can be conveyed via MAC-CE.

In one example, the N-bit bitmap indicator can be conveyed via RRC.

The number of triggered associations (say M) can be fixed, configured (via RRC), or reported by the UE 116.

In one example, each or some of N configured DL RSs/UL RSs associations can be triggered via two-part DCI to perform DL RS receptions/measurements and/or UL RS transmissions for the calibration. For example, in the first-part DCI, 1-bit indicator is used to indicate whether each of the N configured DL RS(s)/UL RS(s) associations being triggered ('1') or not ('0'). If the first-part DCI indicates each of associations being triggered, the second-part DCI does not convey any indicator for this (hence may be absent/not provided). If the first-part DCI indicates not all associations being triggered, the second-part DCI conveys an N-bit bitmap indicator, where the N-bit bitmap indicator indicates which DL RS(s)/UL RS(s) associations are triggered to perform DL RS receptions and/or UL RS transmissions for the calibration.

In one example, the N-bit bitmap indicator can be used to perform UL RS transmissions corresponding to triggered DL RSs/UL RSs associations.

In one example, the N-bit bitmap indicator can be used to perform DL RS receptions and UL RS transmissions corresponding to triggered DL RSs/UL RSs associations.

Or the first-part DCI includes the N-bit bitmap. If the bitmap indicates each of the associations being triggered, the second-part DCI does not convey any indicator for this (hence may be absent). If the bitmap indicates not all associations being triggered, the second-part DCI conveys additional information about the triggered association.

Or the first-part DCI includes the value of M (number of triggered associations). If M indicates each of the associations being triggered, the second-part DCI does not convey any indicator for this (hence may be absent). If M indicates not all associations being triggered, the second-part DCI conveys the information about triggered association (e.g., indices, or bitmap or a combinatorial indicator for choosing/selecting M out of N).

In one embodiment, a UE can be configured to periodically or semi-persistently perform DL RS receptions and/or UL RS transmissions for calibration, where DL RS(s) and UL RS(s) are associated/configured in a way according to one or more embodiments described herein. Each or some (a subset) of the configured DL RS(s)/UL RS(s) associations can be configured to periodically or semi-persistently perform DL RS receptions and/or UL RS transmissions for the calibration. For a periodic operation, it can be configured with higher-layer parameters, i.e., RRC parameters. For a semi-persistent operation, activation/deactivation can be configured via DCI or MAC-CE.

In one embodiment, when a UE is configured to perform UL RS transmission, the UE 116 designs matched filter (MF) precoder (or beamformer, precoding vector/matrix, beamforming vector/matrix) that is determined by DL channel measured from an associated DL RS (or associated DL RSs) and applies the precoder for the UL RS transmission.

In one embodiment, L port groups of a DL RS (e.g., CSI-RS) resource are associated/linked with M UL RS (e.g., SRS) resources for the calibration mechanism, where L≥1 and M≥1. Here, 'association' or 'linkage' between port group(s) of a DL RS resource and UL RS resource(s) refers at least one of the following examples:

In one example, the precoder (of UE) for the transmission of UL RS resource is determined based on the measurement of an associated port group of the DL RS resource with the UL RS resource.

In one example, the precoder (of UE) for the transmission of UL RS resource is determined based on the measurement of associated port groups of the DL RS resource with the UL RS resource.

In one example, the precoder (of gNB) for the transmission of DL RS resource is determined based on the measurement of an associated UL RS resource with the DL RS resource.

In one example, the precoder (of gNB) for the transmission of DL RS resource is determined based on the measurement of associated UL RS resources with the DL RS resource.

FIG. 18 illustrates a diagram 1800 of one port group (PG) associated to one UL RS according to embodiments of the present disclosure. For example, in diagram 1800 the PGs can be received by the UE 116 of FIG. 3. This example is for illustration only and other embodiments can be used without departing from the scope of the present disclosure.

In one example, (one-to-one association) one port group of a DL RS resource is associated with one UL RS resource (e.g., for a calibration mechanism). We call the association 'one-to-one PG/RS association' for convenience in the present disclosure but should not be limited to the terminology, where PG stands for port-group.

Figure 19:
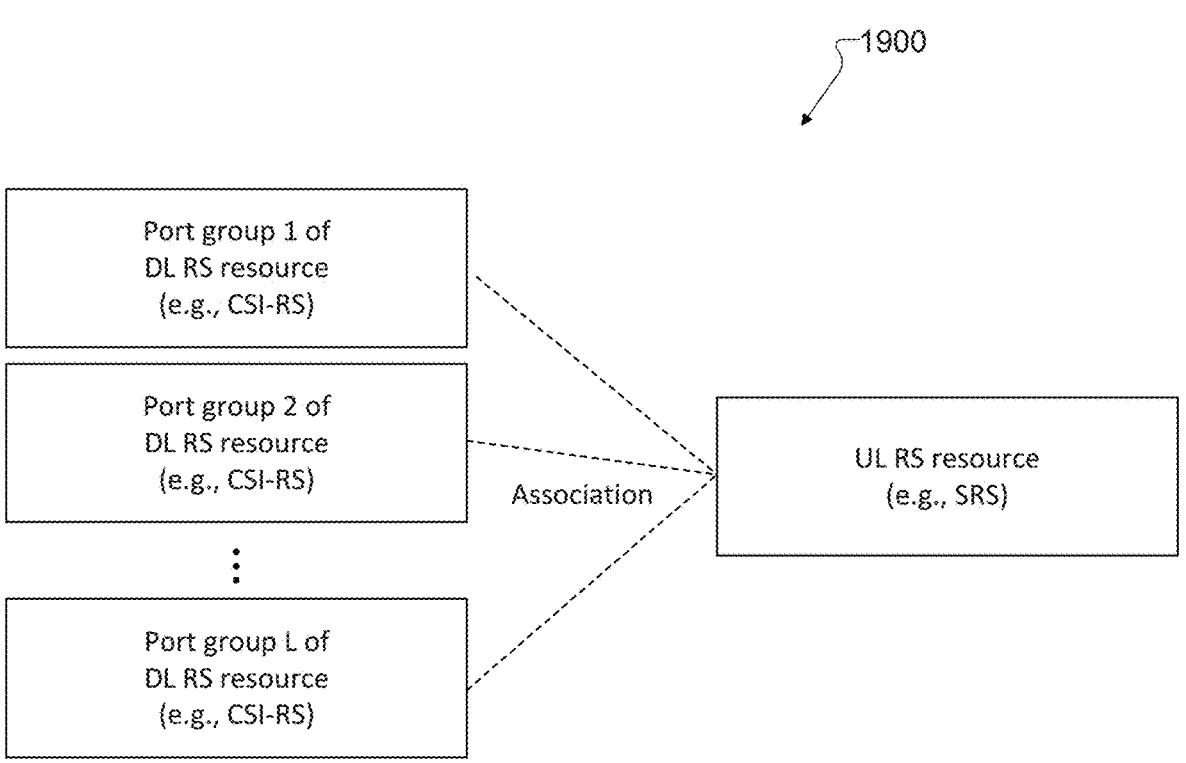
FIG. 19 illustrates a diagram of a plurality of PGs associated to one UL RS according to embodiments of the present disclosure.

FIG. 19 illustrates a diagram 1900 of a plurality of PGs associated to one UL RS according to embodiments of the present disclosure. For example, in diagram 1900 the PGs can be received by the UE 116 of FIG. 3. This example is for illustration only and other embodiments can be used without departing from the scope of the present disclosure.

In one example, (many-to-one association) L>1 port groups of a DL RS resource are associated with one UL RS resource (e.g., for a calibration mechanism). We call the association 'many-to-one PG/RS association' for convenience in the present disclosure but should not be limited to the terminology.

Figures 20, 21:
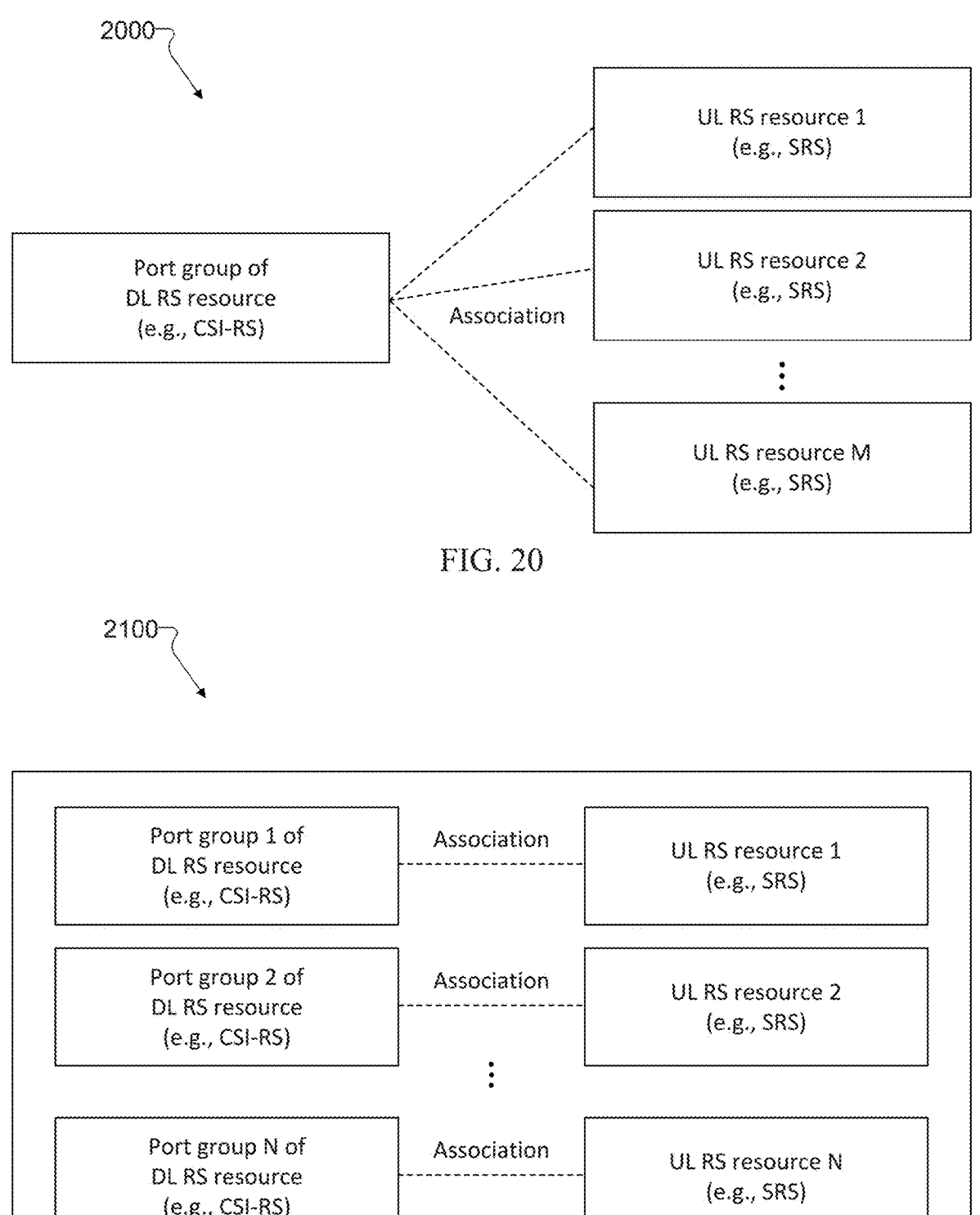
FIG. 20 illustrates a diagram of one PG associated to a plurality of UL RSs according to embodiments of the present disclosure.
FIG. 21 illustrates a diagram of a plurality of one PG associated to one UL RS according to embodiments of the present disclosure.

FIG. 20 illustrates a diagram 2000 of one PG associated to a plurality of UL RSs according to embodiments of the present disclosure. For example, in diagram 2000 the PGs can be received by the UE 116 of FIG. 3. This example is for illustration only and other embodiments can be used without departing from the scope of the present disclosure.

In one example, (one-to-many association) one port group of a DL RS resource is associated with M>1 UL RS resources (e.g., for a calibration mechanism). We call the association 'one-to-many PG/RS association' for convenience in the present disclosure but should not be limited to the terminology.

In one embodiment, any combination of one or multiple associations each of which is either one-to-one, many-to-one, or one-to-many association according to one or more embodiments described herein can be configured via higher-layer (e.g., RRC) parameter (e.g., for a calibration mechanism).

In one example, a supported configuration can be subject to UE capability (i.e., the UE 116 reports the information about the association types or combinations of multiple associations that it can support).

FIG. 21 illustrates a diagram 2100 of a plurality of one PG associated to one UL RS according to embodiments of the present disclosure. For example, in diagram 2100 the PGs can be received by the UE 116 of FIG. 3. This example is for illustration only and other embodiments can be used without departing from the scope of the present disclosure.

In one example, N one-to-one PG/RS associations can be configured (e.g., for a calibration mechanism).

Figure 22:
FIG. 22 illustrates a diagram of a plurality of PGs associated to one UL RS according to embodiments of the present disclosure.
Figure 22:
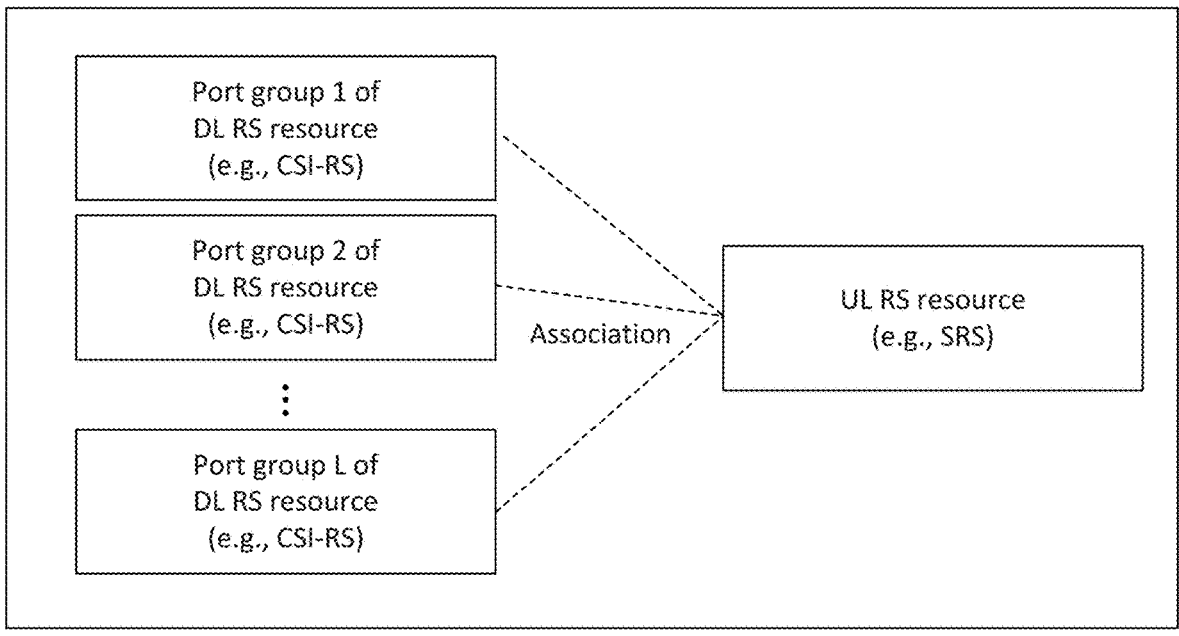

FIG. 22 illustrates a diagram 2200 of a plurality of PGs associated to one UL RS according to embodiments of the present disclosure. For example, in diagram 2200 the PGs can be received by the UE 116 of FIG. 3. This example is for illustration only and other embodiments can be used without departing from the scope of the present disclosure.

In one example, 1 many-to-one PG/RS association can be configured (e.g., for a calibration mechanism).

Figure 23:
FIG. 23 illustrates a diagram of a plurality of one PG associated to one UL RS according to embodiments of the present disclosure.

FIG. 23 illustrates a diagram 2300 of a plurality of one PG associated to one UL RS according to embodiments of the present disclosure. For example, in diagram 2300 the PGs can be received by the UE 116 of FIG. 3. This example is for illustration only and other embodiments can be used without departing from the scope of the present disclosure.

In one example, N one-to-many PG/RS associations can be configured (e.g., for a calibration mechanism).

Figure 24:
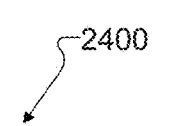
FIG. 24 illustrates a diagram of a plurality of PGs associated to one UL RS according to embodiments of the present disclosure.

FIG. 24 illustrates a diagram 2400 of a plurality of PGs associated to one UL RS according to embodiments of the present disclosure. For example, in diagram 2400 the PGs can be received by the UE 116 of FIG. 3. This example is for illustration only and other embodiments can be used without departing from the scope of the present disclosure.

In one example, N many-to-one PG/RS associations can be configured (e.g., for a calibration mechanism).

Figure 25:
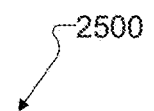
FIG. 25 illustrates a diagram of a one-to one association, a one-to-many associations, and a many-to-one associations according to embodiments of the present disclosure.

FIG. 25 illustrates a diagram 2500 of a one-to one association, a one-to-many associations, and a many-to-one associations according to embodiments of the present disclosure. For example, in diagram 2500 the PGs can be received by the UE 116 of FIG. 3. This example is for illustration only and other embodiments can be used without departing from the scope of the present disclosure.

In one example, $N_1$ one-to-one PG/RS associations, $N_2$ one-to-many PG/RS associations, and $N_3$ many-to-one PG/RS associations can be configured (e.g., for a calibration mechanism), where $N_1 \geq 0$, $N_2 \geq 0$, $N_3 \geq 0$ and $(N_1, N_2, N_3) \neq (0,0,0)$. For example, with reference to FIG. 25, the case of $(N_1, N_2, N_3) = (1,1,1)$ is shown.

In one example, a combination of one or more one-to-one PG/RS associations and one or more many-to-one PG/RS associations can be configured (e.g., for a calibration mechanism).

In one example, a combination of one or more one-to-one PG/RS associations and one or more one-to-many PG/RS associations can be configured (e.g., for a calibration mechanism).

In one example, a combination of one or more many-to-one PG/RS associations and one or more one-to-many PG/RS associations can be configured (e.g., for a calibration mechanism).

In one example, a combination of one or more one-to-one PG/RS associations, one or more many-to-one PG/RS associations, and one or more one-to-many PG/RS associations can be configured (e.g., for a calibration mechanism).

In one embodiment, the higher-layer parameter usage of a configured set of UL RSs, (e.g., SRS resource set) for a calibration mechanism can be set to a new use-case terminology, for example, it could be 'tddCjt', 'tddCalib', 'cjt-Calib', 'calibration', 'none' or etc.

In one embodiment, the higher-layer parameter usage of a configured set of UL RSs, (e.g., SRS resource set) for a calibration mechanism can be set to an existing use case.

In one example, the higher-layer parameter usage can be set to 'nonCodebook'.

In one example, the higher-layer parameter usage can be set to 'codebook'.

In one example, the higher-layer parameter usage can be set to 'antennaSwitching'.

In one example, the higher-layer parameter usage can be set to 'beamManagement'.

In one embodiment, an association according to one or more embodiments described herein can be provided by an existing higher-layer parameter.

In one example, a higher-layer parameter spatialRelation-Info of a SRS resource (or SRS resource set or multiple SRS resources) provides the association with the corresponding DL RS (e.g., CSI-RS) or the corresponding port group(s) of DL RS resource.

In one example, a higher-layer parameter associatedCSI-RS for SRS resource set (or a SRS resource or multiple SRS resources) provides the association with the corresponding DL RS (e.g., CSI-RS) or the corresponding port group(s) of DL RS resource.

In one example, a higher-layer parameter qclInfo or tciState of a CSI-RS resource (or CSI-RS resource set or multiple CSI-RS resources or a port group or port groups) provides the association with the corresponding UL RS(s) (e.g., SRS).

In one example, a higher-layer parameter associatedSRS for CSI-RS resource set (or a CSI-RS resource or multiple CSI-RS resources or a port group or port groups) provides the association with the corresponding UL RS(s) (e.g., SRS).

In one embodiment, a UE can be triggered/indicated/configured, via DCI or MAC-CE or RRC, to perform DL RS reception/measurement and/or UL RS transmission(s) for calibration, where port group(s) of DL RS and UL RS(s) are associated/configured in a way according to one or more embodiments described herein. In addition, either each or some (a subset) of the configured DL RS/UL RS(s) associations can be triggered to perform DL RS reception/measurement and/or UL RS transmissions for the calibration. This triggering can be a DCI field in a DCI (DL-DCI or UL-DCI or a dedicated DCI). In one example, the DCI field can be 'calibration request' or 'CSI request'. In one example, the DCI field is an existing DCI field, and a codepoint of the field is used for triggering the association(s). Optionally, the triggering can be via a MAC CE, or MAC CE+DCI. The MAC CE can be used to activate/select a subset of the RRC configured associations and DCI can trigger the association(s) from the activate subset.

In one example, the UE 116 can be triggered/indicated/configured to jointly perform DL RS reception/measurement and UL RS transmissions, i.e., the UE 116 measures the configured DL RS and (subsequently) performs UL RS transmissions wherein the precoder for the transmission of each UL RS is determined (e.g., matched filter precoder) based on the measurement of an associated port group(s) of DL RS.

In one example, the UE 116 can be triggered/indicated/configured to (separately) either perform DL RS reception or UL RS transmissions. For example, an associated port group of DL RS (or associated port groups of DL RS) is indicated via UL RS request field (e.g., SRS request field) in DCI (e.g., DCI format 0_1, 1_1, 0_2, 1_2), and the UE 116 shall perform UL RS transmission wherein the precoder for the transmission of UL RS is determined based on the measurement of the associated port group of DL RS (or the associated port groups of DL RS).

Figure 26:
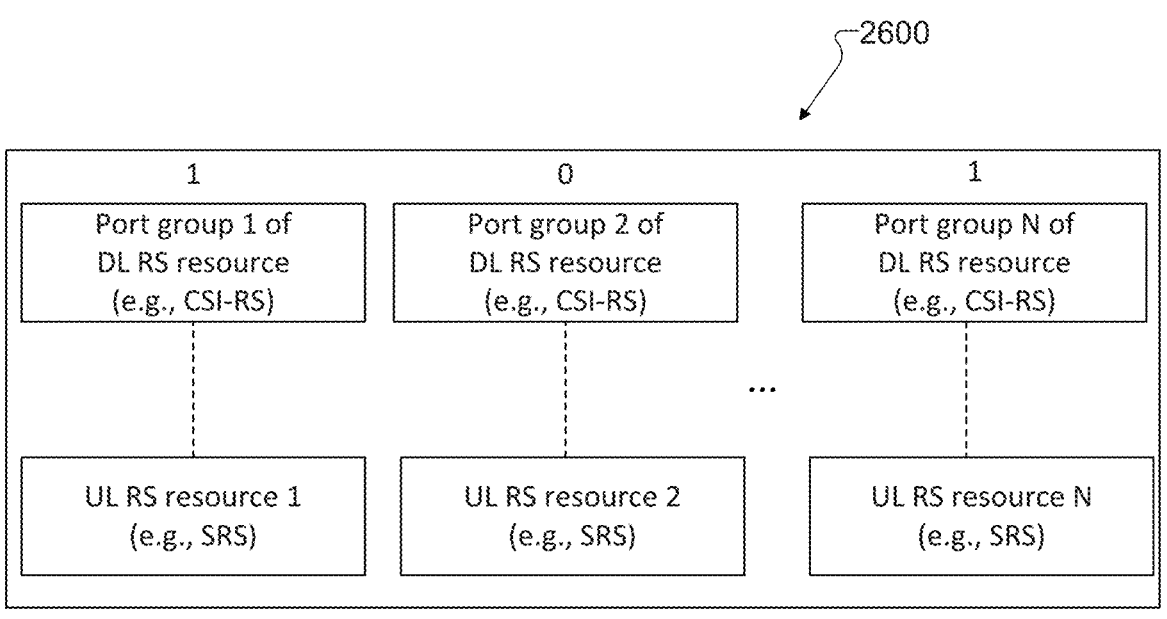
FIG. 26 illustrates a diagram of a bitmap indicator to trigger/indicate a subset of a plurality of PGs associated to UL RSs according to embodiments of the present disclosure.

FIG. 26 illustrates a diagram 2600 of a bitmap indicator to trigger/indicate a subset of a plurality of PGs associated to UL RSs according to embodiments of the present disclosure. For example, diagram 2600 can be utilized by the UE 116 of FIG. 3. This example is for illustration only and other embodiments can be used without departing from the scope of the present disclosure.

In one example, an N-bit bitmap indicator can be used to trigger each or some of N configured port group(s) of DL RS/UL RS(s) associations to perform DL RS reception/measurement and/or UL RS transmissions for the calibration. For example, i-th bit of the bitmap indicator indicates i-th association being whether triggered ('1') or not ('0').

In one example, the N-bit bitmap indicator can be used to perform UL RS transmissions corresponding to triggered port groups of DL RS/UL RSs associations.

In one example, the N-bit bitmap indicator can be used to perform DL RS reception and UL RS transmissions corresponding to triggered port groups of DL RS/UL RSS associations.

In one example, the N-bit bitmap indicator can be conveyed via DCI.

In one example, the N-bit bitmap indicator can be conveyed via MAC-CE.

In one example, the N-bit bitmap indicator can be conveyed via RRC.

The number of triggered associations (say M) can be fixed, configured (via RRC), or reported by the UE 116.

In one example, each or some of N configured port groups of DL RS/UL RSS associations can be triggered via two-part DCI to perform DL RS reception/measurement and/or UL RS transmissions for the calibration. For example, in the first-part DCI, 1-bit indicator is used to indicate whether each of the N configured port groups of DL RS/UL RS(s) associations being triggered ('1') or not ('0'). If the first-part DCI indicates each of the associations being triggered, the second-part DCI does not convey any indicator for this (hence may be absent/not provided). If the first-part DCI indicates not all associations being triggered, the second-part DCI conveys an N-bit bitmap indicator, where the N-bit bitmap indicator indicates which port groups of DL RS/UL RS(s) associations are triggered to perform DL RS reception and/or UL RS transmissions for the calibration.

In one example, the N-bit bitmap indicator can be used to perform UL RS transmissions corresponding to triggered port groups of DL RS/UL RSs associations.

In one example, the N-bit bitmap indicator can be used to perform DL RS reception and UL RS transmissions corresponding to triggered port groups of DL RS/UL RSS associations.

Or the first-part DCI includes the N-bit bitmap. If the bitmap indicates each of the associations being triggered, the second-part DCI does not convey any indicator for this (hence may be absent). If the bitmap indicates not all associations being triggered, the second-part DCI conveys additional information about the triggered association.

Or the first-part DCI includes the value of M (number of triggered associations). If M indicates each of the associations being triggered, the second-part DCI does not convey any indicator for this (hence may be absent). If M indicates not all associations being triggered, the second-part DCI conveys the information about triggered association (e.g., indices, or bitmap or a combinatorial indicator for choosing/selecting M out of N).

In one embodiment, a UE can be configured to periodically or semi-persistently perform DL RS reception/measurement and/or UL RS transmissions for calibration, where port group(s) of DL RS and UL RS(s) are associated/configured in a way according to one or more embodiments described herein. Each or some (a subset) of the configured port group(s) of DL RS/UL RS(s) associations can be configured to periodically or semi-persistently perform DL RS reception/measurement and/or UL RS transmissions for the calibration. For a periodic operation, it can be configured with higher-layer parameters, i.e., RRC parameters. For a semi-persistent operation, activation/deactivation can be configured via DCI or MAC-CE.

In one embodiment, when a UE is configured to perform UL RS transmission, the UE 116 designs matched filter (MF) precoder (or beamformer, precoding vector/matrix, beamforming vector/matrix) that is determined by DL channel measured from an associated port group of DL RS (or associated port groups of DL RS) and applies the precoder for the UL RS transmission.

In one embodiment, similar to the extension according to one or more embodiments described herein, DL RS resource and port group of UL RS resource can be a unit for association. Using the association unit with DL RS resource/port group of UL RS resource, one or more embodiments described herein can be applied to this embodiment.

In one embodiment, similar to the extension of from one or more embodiments described herein, port of DL RS resource and port group of UL RS resource can be a unit for association. Using the association unit with port of DL RS resource/port group of UL RS resource, one or more embodiments described herein can be applied to this embodiment.

In one embodiment, similar to the extension according to one or more embodiments described herein, port group of DL RS resource and port of UL RS resource can be a unit for association. Using the association unit with port group of DL RS resource/port of UL RS resource, one or more embodiments described herein can be applied to this embodiment.

In one embodiment, similar to the extension of from one or more embodiments described herein, port group of DL RS resource and port group of UL RS resource can be a unit for association. Using the association unit with port group of DL RS resource/port group of UL RS resource, one or more embodiments described herein can be applied to this embodiment.

In one embodiment, similar to the extension of from one or more embodiments described herein, port of DL RS resource and port of UL RS resource can be a unit for association. Using the association unit with port of DL RS resource/port of UL RS resource, one or more embodiments described herein can be applied to this embodiment.

In one embodiment, similar to the extension of from one or more embodiments described herein, DL RS resource and UL RS resource set can be a unit for association. Using the association unit with DL RS resource/UL RS resource set, one or more embodiments described herein can be applied to this embodiment.

In one embodiment, similar to the extension of from one or more embodiments described herein, DL RS resource set and UL RS resource can be a unit for association. Using the association unit with DL RS resource set/UL RS resource, one or more embodiments described herein can be applied to this embodiment.

In one embodiment, similar to the extension of from one or more embodiments described herein, DL RS resource set and UL RS resource set can be a unit for association. Using the association unit with DL RS resource set/UL RS resource set, one or more embodiments described herein can be applied to this embodiment.

In one embodiment, a UE can initiate a calibration operation, e.g., one of the operations according to one or more embodiments described herein by transmitting uplink control information (UCI) or UL MAC-CE, similar to scheduling request (SR).

Figure 27:
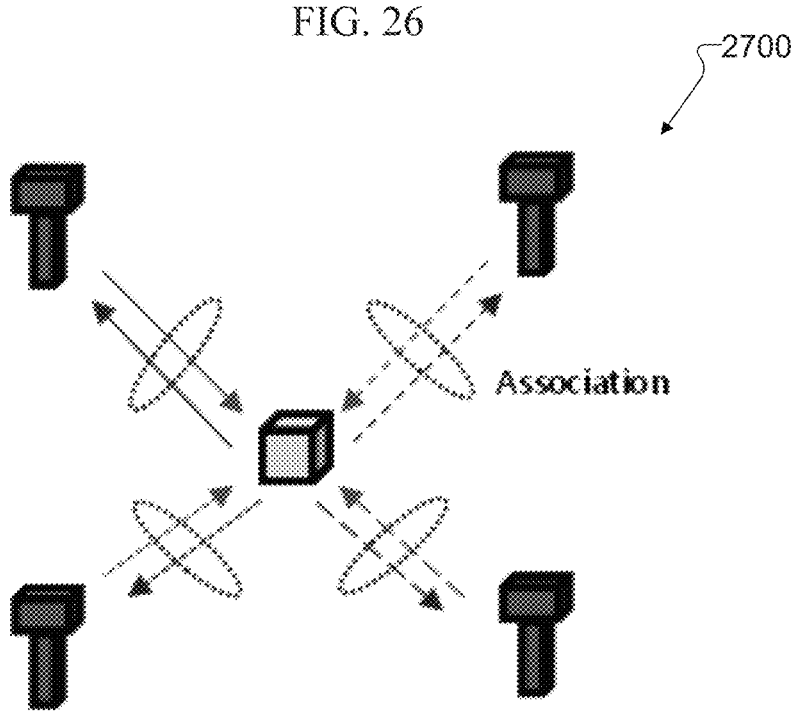
FIG. 27 illustrates a diagram of calibration across multiple TRPs according to embodiments of the present disclosure.

FIG. 27 illustrates a diagram 2700 of calibration across multiple TRPs according to embodiments of the present disclosure. For example, in diagram 2700 the DL RS can be received by the UE 116 of FIG. 3 and the UL RS can be received by the gNB 102 of FIG. 1. This example is for illustration only and other embodiments can be used without departing from the scope of the present disclosure.

In one embodiment, calibration across multiple TRPs (to align TDD uplink-downlink reciprocity) can be done using at least one of embodiments described herein.

In one embodiment, a UE is configured with a calibration mechanism, wherein the UE 116 is configured to perform one or more UL RS transmission(s), to perform one or more DL RS reception(s)/measurement(s), and/or to report calibration-related information (e.g., for calibration among multiple TRPs). The multiple TRPs can be associated with one base station (gNB/cell) or, with more than one base stations (gNBs/cells). This configuration can be performed via higher-layer (RRC) signaling. In one example, DL RS reception and calibration-related information reporting can be dynamically triggered via L1 or L2 signaling (PDCCH or MAC-CE). In one example, DL RS reception and calibration-related information reporting can be aperiodically triggered/indicated via L1 or L2 signaling (PDCCH or MAC-CE). In one example, DL RS reception and calibration-related information reporting can be semi-persistently performed via activation/deactivation of L1 or L2 signaling (PDCCH or MAC-CE). In one example, DL RS can be DL DMRS or a TRS or a dedicated DL RS (for calibration purpose). In one example UL RS can be SRS or UL DMRS or a dedicated UL RS (for calibration purpose).

Figure 28:
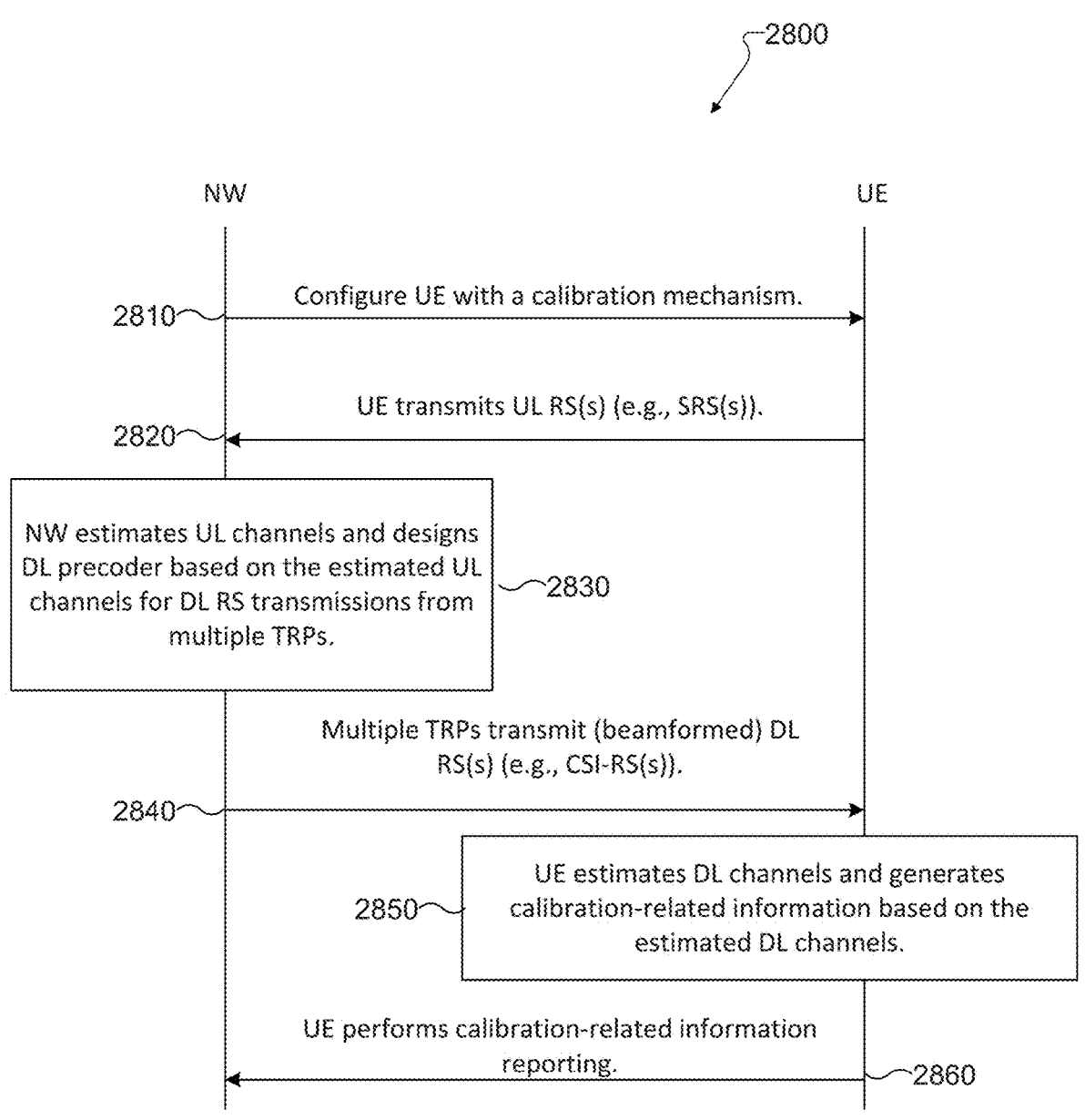
FIG. 28 illustrates a flowchart of an example process of signal flow with reporting according to embodiments of the present disclosure.

FIG. 28 illustrates a flowchart of an example process 2800 of signal flow with reporting according to embodiments of the present disclosure. For example, process 2800 can be performed by the UE 116 and the gNB 102 and/or the network 130 in the wireless network 100 of FIG. 1. This example is for illustration only and other embodiments can be used without departing from the scope of the present disclosure.

The process begins in 2810, the NW 130 provides the UE 116 a configuration with a calibration mechanism. In 2820, the UE 116 transmits UL RS(s) to the network 130. In 2830, the network 130 estimates UL channels and designs a DL precoder based on the estimated UL channels for DL RS transmissions from the multiple TRPs. In 2840, the network 130 and/or multiple TRPs transmit/beamform DL RSs to the UE 116. In 2850, the UE 116 estimates DL channels and generates calibration-related information based on the estimated DL channels. In 2860, the UE 116 performs calibration-related information reporting and provides the reporting to the network 130 and/or the multiple TRPs.

The three steps depicted in the flow diagram (transmission of UL RS, reception of DL RS, and reporting of calibration-related information) can be configured or activated jointly. In one example, at least one of the three steps can be configured or activated separately. In one example, each of the three steps can be configured or activated separately. For instance, the UE can be configured or triggered (in case of semi-persistent and aperiodic SRS) to transmit SRS separately (as it normally is). But the reception of the DL RS (such as aperiodic CSI-RS) can be configured and/or triggered jointly with the reporting of the calibration-related information. In one example, this joint triggering can be performed via one or more dedicated triggering states (higher-layer configured) using the CSI request DCI field.

In one example, the term 'precoder' in the present disclosure can be replaced with a spatial information (or TCI state, or spatialRelationInfo) or source RS or spatial filter, beamformer, beamforming vectors/matrices, precoding vector/matrices, or any other functionally equivalent quantity, which can be used for UL RS transmission.

The configuration of the DL RS(s) (e.g., CSI-RS) can have no restriction or at least one of the following restrictions.

In one example, only 1-port DL RS can be configured.

In one example, only TRS (CSI-RS for tracking) can be configured.

In one example, only periodic DL-RS can be configured.

In one example, higher density (e.g., 3 REs per port) DL RS for CSI can be configured.

In one example, one slot DL RS measurement can be configured.

In one example, a measurement window (multiple slots) of DL RS measurement can be configured: SP (semi-persistent) CSI-RS or CSI-RS with repetition ON or multiple aperiodic CSI-RS with different offsets (e.g., uniformly separated).

In one example, the latest slot with DL RS(s) from the slot for UL RS transmissions can be configured or pre-determined or fixed.

In one example, there is a minimum time gap (delay) K, e.g., in slots or number of OFDM symbols between the DL RS measurement and UL RS transmission. This is to allow the UE to compute necessary information for UL RS transmission. For example, K=1, 2, . . . . In another example, K=7, 14, . . . .

The configuration of the UL RS(s) (e.g., SRS) can have no restriction or at least one of the following restrictions.

In one example, only 1-port UL RS can be configured.

In one example, only periodic UL-RS can be configured.

In one example, higher density (e.g., 3 REs per port) UL RS for SRS can be configured.

In one example, one slot UL RS transmission can be configured.

In one example, a measurement window (multiple slots) of UL RS transmission can be configured: SP (semi-persistent) SRS or SRS with repetition ON or multiple aperiodic SRS with different offsets (e.g., uniformly separated).

In one example, the latest slot with UL RS transmission from the slot for DL RS measurements can be configured or pre-determined or fixed.

In one example, there is a minimum time gap (delay) K, e.g., in slots or number of OFDM symbols between the UL RS transmission and DL RS measurement. This is to allow the UE to compute necessary information for UL RS transmission. For example, K=1, 2, . . . . In another example, K=7, 14, . . . .

In one embodiment, L DL RS (e.g., CSI-RS) resources are associated/linked with M UL RS (e.g., SRS) resources for the calibration mechanism, where L≥1 and M≥1. Here, 'association' or 'linkage' between DL RS resource(s) and UL RS resource(s) refers at least one of the following examples:

In one example, the precoder (of UE) for the transmission of UL RS resource is determined based on the measurement of an associated DL RS resource with the UL RS resource.

In one example, the precoder (of UE) for the transmission of UL RS resource is determined based on the measurement of associated DL RS resources with the UL RS resource.

In one example, the precoder (of gNB) for the transmission of DL RS resource is determined based on the measurement of an associated UL RS resource with the DL RS resource.

In one example, the precoder (of gNB) for the transmission of DL RS resource is determined based on the measurement of associated UL RS resources with the DL RS resource.

In one example, with reference to FIG. 9, (one-to-one association) one DL RS resource is associated with one UL RS resource (e.g., for a calibration mechanism). We call the association 'one-to-one RS association' for convenience in the present disclosure but should not be limited to the terminology.

In one example, with reference to FIG. 10, (many-to-one association) L>1 DL RS resources are associated with one UL RS resource (e.g., for a calibration mechanism). We call the association 'many-to-one RS association' for convenience in the present disclosure but should not be limited to the terminology.

In one example, with reference to FIG. 11, (one-to-many association) one DL RS resource is associated with M>1 UL RS resources (e.g., for a calibration mechanism). We call the association 'one-to-many RS association' for convenience in the present disclosure but should not be limited to the terminology.

In one embodiment, any combination of one or multiple associations each of which is either one-to-one, many-to-one, or one-to-many association according to one or more embodiments described herein can be configured via higher-layer (e.g., RRC) parameter (e.g., for a calibration mechanism).

In one example, a supported configuration can be subject to UE capability (i.e., the UE reports the information about the association types or combinations of multiple associations that it can support).

In one example, N one-to-one RS associations can be configured (e.g., for a calibration mechanism). For example, with reference to FIG. 12, the N one-to-one RS associations is shown.

In one example, 1 many-to-one RS association can be configured (e.g., for a calibration mechanism). For example, with reference to FIG. 13, the 1 many-to-one RS association is shown.

In one example, N one-to-many RS associations can be configured (e.g., for a calibration mechanism). For example, with reference to FIG. 14, the N one-to-many RS associations is shown.

In one example, N many-to-one RS associations can be configured (e.g., for a calibration mechanism). For example, with reference to FIG. 15, the N many-to-one RS associations is shown.

In one example, $N_1$ one-to-one RS associations, $N_2$ one-to-many RS associations, and $N_3$ many-to-one RS associations can be configured (e.g., for a calibration mechanism), where $N_1 \geq 0$, $N_2 \geq 0$, $N_3 \geq 0$ and $(N_1, N_2, N_3) \neq (0,0,0)$. For example, with reference to FIG. 17, the case of $(N_1, N_2, N_3) = (1,1,1)$ is shown.

In one example, a combination of one or more one-to-one RS associations and one or more many-to-one RS associations can be configured (e.g., for a calibration mechanism).

In one example, a combination of one or more one-to-one RS associations and one or more one-to-many RS associations can be configured (e.g., for a calibration mechanism).

In one example, a combination of one or more many-to-one RS associations and one or more one-to-many RS associations can be configured (e.g., for a calibration mechanism).

In one example, a combination of one or more one-to-one RS associations, one or more many-to-one RS associations, and one or more one-to-many RS associations can be configured (e.g., for a calibration mechanism).

In one embodiment, the higher-layer parameter usage of a configured set of UL RSs, (e.g., SRS resource set) for a calibration mechanism can be set to a new use-case terminology, for example, it could be 'tddCjt', 'tddCalib', 'cjt-Calib', 'calibration', 'none', etc.

In one embodiment, the higher-layer parameter usage of a configured set of UL RSs, (e.g., SRS resource set) for a calibration mechanism can be set to an existing use case.

In one example, the higher-layer parameter usage can be set to 'nonCodebook'.

In one example, the higher-layer parameter usage can be set to 'codebook'.

In one example, the higher-layer parameter usage can be set to 'antennaSwitching'.

In one example, the higher-layer parameter usage can be set to 'beamManagement'.

In one embodiment, an association described according to one or more embodiments described herein can be provided by an existing higher-layer parameter.

In one example, a higher-layer parameter spatialRelation-Info of a SRS resource (or SRS resource set or multiple SRS resources) provides the association with the corresponding DL RS(s) (e.g., CSI-RS).

In one example, a higher-layer parameter associatedCSI-RS for SRS resource set (or a SRS resource or multiple SRS resources) provides the association with the corresponding DL RS(s) (e.g., CSI-RS).

In one example, a higher-layer parameter qclInfo or tciState of a CSI-RS resource (or CSI-RS resource set or multiple CSI-RS resources) provides the association with the corresponding UL RS(s) (e.g., SRS).

In one example, a higher-layer parameter associatedSRS for CSI-RS resource set (or a CSI-RS resource or multiple CSI-RS resources) provides the association with the corresponding UL RS(s) (e.g., SRS).

In one embodiment, a UE can be triggered/indicated/configured, via DCI or MAC-CE or RRC, to perform UL RS transmission and/or DL RS receptions/measurements and/or calibration-related information reporting, where DL RS(s) and UL RS(s) are associated/configured in a way according to one or more embodiments described herein. In addition, either each or some (a subset) of the configured DL RS(s)/UL RS(s) associations can be triggered to perform UL RS transmissions and/or DL RS receptions/measurement(s) and/or calibration-related information reporting. This triggering can be a DCI field in a DCI (DL-DCI or UL-DCI or a dedicated DCI). In one example, the DCI field can be 'calibration request' or 'CSI request' or 'calibration reporting request'. In one example, the DCI field is an existing DCI field, and a codepoint of the field is used for triggering the association(s). Optionally, the triggering can be via a MAC CE, or MAC CE+DCI. In later, the MAC CE can be used to activate/select a subset of the RRC configured associations and DCI can trigger the association(s) from the activate subset.

In one example, the UE can be triggered/indicated/configured to jointly perform UL RS transmissions and DL RS receptions and calibration-related information reporting, i.e., the UE performs UL RS transmissions and (subsequently) measures the configured DL RSs where the precoder for the transmission of each DL RS is determined (e.g., matched filter precoder) based on the measurement of an associated UL RS(s) at the NW 130 side.

In one example, the UE can be triggered/indicated/configured to (separately) either perform UL RS transmissions and DL RS receptions and calibration-related information reporting or DL RS receptions and calibration-related information reporting or calibration-related information reporting only. For example, an associated DL RS (or associated DL RSs) is indicated via CSI request field or 'calibration reporting request' in DCI, and the UE shall perform calibration-related information reporting based on the measurement of the associated DL RS (or the associated DL RSs).

In one example, an N-bit bitmap indicator can be used to trigger each or some of N configured UL RS(s)/DL RS(s) associations to perform UL RS transmissions and/or DL RS receptions and/or calibration-related information reporting. For example, i-th bit of the bitmap indicator indicates i-th association being whether triggered ('1') or not ('0').

In one example, the N-bit bitmap indicator can be used to perform UL RS transmissions and DL RS receptions corresponding to triggered DL RSs/UL RSs associations and calibration-related information reporting.

In one example, the N-bit bitmap indicator can be used to perform DL RS receptions corresponding to triggered DL RSs/UL RSs associations and calibration-related information reporting.

In one example, the N-bit bitmap indicator can be used to perform UL RS transmissions and DL RS receptions corresponding to triggered DL RSs/UL RSs associations.

In one example, the N-bit bitmap indicator can be used to perform UL RS transmissions corresponding to triggered DL RSs/UL RSs associations and calibration-related information reporting.

In one example, the N-bit bitmap indicator can be used to perform UL RS transmissions corresponding to triggered DL RSs/UL RSs associations.

In one example, the N-bit bitmap indicator can be used to perform DL RS receptions corresponding to triggered DL RSs/UL RSs.

In one example, the N-bit bitmap indicator can be used to perform calibration-related information reporting corresponding to triggered DL RSs/UL RSs.

In one example, the N-bit bitmap indicator can be conveyed via DCI.

In one example, the N-bit bitmap indicator can be conveyed via MAC-CE.

In one example, the N-bit bitmap indicator can be conveyed via RRC.

The number of triggered associations (say M) can be fixed, configured (via RRC), or reported by the UE.

In one example, with reference to FIG. 17, each or some of N configured DL RSs/UL RSs associations can be triggered via two-part DCI to perform UL RS transmissions and/or DL RS receptions/measurements and/or calibration-related information reporting for the calibration. For example, in the first-part DCI, 1-bit indicator is used to indicate whether each of the N configured DL RS(s)/UL RS(s) associations being triggered ('1') or not ('0'). If the first-part DCI indicates each of the associations being triggered, the second-part DCI does not convey any indicator for this (hence may be absent/not provided). If the first-part DCI indicates not all associations being triggered, the second-part DCI conveys an N-bit bitmap indicator, where the N-bit bitmap indicator indicates which DL RS(s)/UL RS(s) associations are triggered to perform UL RS transmissions and/or DL RS receptions/measurements and/or calibration-related information reporting for the calibration.

In one example, the N-bit bitmap indicator can be used to perform UL RS transmissions and DL RS receptions corresponding to triggered DL RSs/UL RSs associations and calibration-related information reporting.

In one example, the N-bit bitmap indicator can be used to perform DL RS receptions corresponding to triggered DL RSs/UL RSs associations and calibration-related information reporting.

In one example, the N-bit bitmap indicator can be used to perform UL RS transmissions and DL RS receptions corresponding to triggered DL RSs/UL RSs associations.

In one example, the N-bit bitmap indicator can be used to perform UL RS transmissions corresponding to triggered DL RSs/UL RSs associations and calibration-related information reporting.

In one example, the N-bit bitmap indicator can be used to perform UL RS transmissions corresponding to triggered DL RSs/UL RSs associations.

In one example, the N-bit bitmap indicator can be used to perform DL RS receptions corresponding to triggered DL RSs/UL RSs.

In one example, the N-bit bitmap indicator can be used to perform calibration-related information reporting corresponding to triggered DL RSs/UL RSs.

Or the first-part DCI includes the N-bit bitmap. If the bitmap indicates each of the associations being triggered, the second-part DCI does not convey any indicator for this (hence may be absent). If the bitmap indicates not all associations being triggered, the second-part DCI conveys additional information about the triggered association.

Or the first-part DCI includes the value of M (number of triggered associations). If M indicates each of the associations being triggered, the second-part DCI does not convey any indicator for this (hence may be absent). If M indicates not all associations being triggered, the second-part DCI conveys the information about triggered association (e.g., indices, or bitmap or a combinatorial indicator for choosing/ selecting M out of N).

In one embodiment, a UE can be configured to periodically or semi-persistently perform UL RS transmissions and/or DL RS receptions and/or calibration-related information reporting for calibration, where DL RS(s) and UL RS(s) are associated/configured in a way according to one or more embodiments described herein. Each or some (a subset) of the configured DL RS(s)/UL RS(s) associations can be configured to periodically or semi-persistently perform UL RS transmissions and/or DL RS receptions and/or calibration-related information reporting for the calibration. For a periodic operation, it can be configured with higher-layer parameters, i.e., RRC parameters. For a semi-persistent operation, activation/deactivation can be configured via DCI or MAC-CE.

In one embodiment, when a UE is configured to perform UL RS transmission, the UE designs matched filter (MF) precoder (or beamformer, precoding vector/matrix, beamforming vector/matrix) that is determined by DL channel measured from an associated DL RS (or associated DL RSs) and applies the precoder for the UL RS transmission.

In one embodiment, when a gNB or NW performs DL RS transmission associated with UL RS(s), the NW 130 designs matched filter (MF) precoder (or beamformer, precoding vector/matrix, beamforming vector/matrix) that is determined by UL channel measured from the associated UL RS (or associated UL RSs) and applies the precoder for the DL RS transmission.

In one embodiment, L port groups of a DL RS (e.g., CSI-RS) resource are associated/linked with M UL RS (e.g., SRS) resources for the calibration mechanism, where $L \geq 1$ and $M \geq 1$. Here, 'association' or 'linkage' between port group(s) of a DL RS resource and UL RS resource(s) refers at least one of the following examples:

In one example, the precoder (of UE) for the transmission of UL RS resource is determined based on the measurement of an associated port group of the DL RS resource with the UL RS resource.
    In one example, the precoder (of UE) for the transmission of UL RS resource is determined based on the measurement of associated port groups of the DL RS resource with the UL RS resource.
    In one example, the precoder (of gNB) for the transmission of port group of DL RS resource is determined based on the measurement of an associated UL RS resource with the port group of the DL RS resource.
    In one example, the precoder (of gNB) for the transmission of port group of DL RS resource is determined based on the measurement of associated UL RS resources with the port group of the DL RS resource.

In one example, with reference to FIG. 18, (one-to-one association) one port group of a DL RS resource is associated with one UL RS resource (e.g., for a calibration mechanism). We call the association 'one-to-one PG/RS association' for convenience in the present disclosure but should not be limited to the terminology, where PG stands for port-group.

In one example, with reference to FIG. 19, (many-to-one association) $L>1$ port groups of a DL RS resource are associated with one UL RS resource (e.g., for a calibration mechanism). We call the association 'many-to-one PG/RS association' for convenience in the present disclosure but should not be limited to the terminology.

In one example, with reference to FIG. 20, (one-to-many association) one port group of a DL RS resource is associated with $M>1$ UL RS resources (e.g., for a calibration mechanism). We call the association 'one-to-many PG/RS association' for convenience in the present disclosure but should not be limited to the terminology.

In one embodiment, any combination of one or multiple associations each of which is either one-to-one, many-to-one, or one-to-many association according to one or more embodiments described herein can be configured via higher-layer (e.g., RRC) parameter (e.g., for a calibration mechanism).

In one example, a supported configuration can be subject to UE capability (i.e., the UE reports the information about the association types or combinations of multiple associations that it can support).

In one example, with reference to FIG. 21, N one-to-one PG/RS associations can be configured (e.g., for a calibration mechanism).

In one example, with reference to FIG. 22, 1 many-to-one PG/RS association can be configured (e.g., for a calibration mechanism).

In one example, with reference to FIG. 23, N one-to-many PG/RS associations can be configured (e.g., for a calibration mechanism).

In one example, with reference to FIG. 24, N many-to-one PG/RS associations can be configured (e.g., for a calibration mechanism).

In one example, $N_1$ one-to-one PG/RS associations, $N_2$ one-to-many PG/RS associations, and $N_3$ many-to-one PG/RS associations can be configured (e.g., for a calibration mechanism), where $N_1 \geq 0$, $N_2 \geq 0$, $N_3 \geq 0$ and $(N_1, N_2, N_3) \neq (0,0,0)$. For example, with reference to FIG. 25, the case of $(N_1, N_2, N_3)=(1,1,1)$ is shown.

In one example, a combination of one or more one-to-one PG/RS associations and one or more many-to-one PG/RS associations can be configured (e.g., for a calibration mechanism).
    In one example, a combination of one or more one-to-one PG/RS associations and one or more one-to-many PG/RS associations can be configured (e.g., for a calibration mechanism).
    In one example, a combination of one or more many-to-one PG/RS associations and one or more one-to-many PG/RS associations can be configured (e.g., for a calibration mechanism).
    In one example, a combination of one or more one-to-one PG/RS associations, one or more many-to-one PG/RS associations, and one or more one-to-many PG/RS associations can be configured (e.g., for a calibration mechanism).

In one embodiment, the higher-layer parameter usage of a configured set of UL RSs, (e.g., SRS resource set) for a calibration mechanism can be set to a new use-case terminology, for example, it could be 'tddCjt', 'tddCalib', 'cjt-Calib', 'calibration', 'none', etc.

In one embodiment, the higher-layer parameter usage of a configured set of UL RSs, (e.g., SRS resource set) for a calibration mechanism can be set to an existing use case.

In one example, the higher-layer parameter usage can be set to 'nonCodebook'.
    In one example, the higher-layer parameter usage can be set to 'codebook'.
    In one example, the higher-layer parameter usage can be set to 'antennaSwitching'.

In one example, the higher-layer parameter usage can be set to 'beamManagement'.

In one embodiment, an association according to one or more embodiments described herein can be provided by an existing higher-layer parameter.

In one example, a higher-layer parameter spatialRelation-Info of a SRS resource (or SRS resource set or multiple SRS resources) provides the association with the corresponding DL RS (e.g., CSI-RS) or the corresponding port group(s) of DL RS resource.

In one example, a higher-layer parameter associatedCSI-RS for SRS resource set (or a SRS resource or multiple SRS resources) provides the association with the corresponding DL RS (e.g., CSI-RS) or the corresponding port group(s) of DL RS resource.

In one example, a higher-layer parameter qclInfo or tciState of a CSI-RS resource (or CSI-RS resource set or multiple CSI-RS resources or a port group or port groups) provides the association with the corresponding UL RS(s) (e.g., SRS).

In one example, a higher-layer parameter associatedSRS for CSI-RS resource set (or a CSI-RS resource or multiple CSI-RS resources or a port group or port groups) provides the association with the corresponding UL RS(s) (e.g., SRS).

In one embodiment, a UE can be triggered/indicated/configured, via DCI or MAC-CE or RRC, to perform UL RS transmission(s) and/or DL RS reception/measurement and/or calibration-related information reporting for calibration, where port group(s) of DL RS and UL RS(s) are associated/configured in a way according to one or more embodiments described herein. In addition, either each or some (a subset) of the configured DL RS/UL RS(s) associations can be triggered to perform UL RS transmission(s) and/or DL RS reception/measurement and/or calibration-related information reporting for the calibration. This triggering can be a DCI field in a DCI (DL-DCI or UL-DCI or a dedicated DCI). In one example, the DCI field can be 'calibration request' or 'CSI request'. In one example, the DCI field is an existing DCI field, and a codepoint of the field is used for triggering the association(s). Optionally, the triggering can be via a MAC CE, or MAC CE+DCI. The MAC CE can be used to activate/select a subset of the RRC configured associations and DCI can trigger the association(s) from the activate subset.

In one example, the UE can be triggered/indicated/configured to jointly perform UL RS transmissions and DL RS receptions and calibration-related information reporting, i.e., the UE performs UL RS transmissions and (subsequently) measures the configured port groups of DL RS where the precoder for the transmission of (each) port group(s) of DL RS is determined (e.g., matched filter precoder) based on the measurement of an associated UL RS(s) at the NW 130 side.

In one example, the UE can be triggered/indicated/configured to (separately) either perform UL RS transmissions and DL RS receptions and calibration-related information reporting or DL RS receptions and calibration-related information reporting or calibration-related information reporting only. For example, an associated port group of DL RS (or associated port groups of DL RS) is indicated via CSI request field or 'calibration reporting request' in DCI, and the UE shall perform calibration-related information reporting based on the measurement of the associated port group of DL RS (or the associated port groups of DL RS).

In one example, with reference to FIG. 26, a N-bit bitmap indicator can be used to trigger each or some of N configured port group(s) of DL RS/UL RS(s) associations to perform UL RS transmissions and/or DL RS reception/measurement and/or calibration-related information reporting for the calibration. For example, i-th bit of the bitmap indicator indicates i-th association being whether triggered ('1') or not ('0').

In one example, the N-bit bitmap indicator can be used to perform UL RS transmissions and DL RS receptions corresponding to triggered port groups of DL RS/UL RSS associations and calibration-related information reporting.

In one example, the N-bit bitmap indicator can be used to perform DL RS receptions corresponding to triggered port groups of DL RS/UL RSs associations and calibration-related information reporting.

In one example, the N-bit bitmap indicator can be used to perform UL RS transmissions and DL RS receptions corresponding to port groups of triggered DL RS/UL RSS associations.

In one example, the N-bit bitmap indicator can be used to perform UL RS transmissions corresponding to triggered port groups of DL RS/UL RSs associations and calibration-related information reporting.

In one example, the N-bit bitmap indicator can be used to perform UL RS transmissions corresponding to triggered port groups of DL RS/UL RSs associations.

In one example, the N-bit bitmap indicator can be used to perform DL RS receptions corresponding to triggered port groups of DL RS/UL RSs.

In one example, the N-bit bitmap indicator can be used to perform calibration-related information reporting corresponding to port groups of triggered DL RSs/UL RSs.

In one example, the N-bit bitmap indicator can be conveyed via DCI.

In one example, the N-bit bitmap indicator can be conveyed via MAC-CE.

In one example, the N-bit bitmap indicator can be conveyed via RRC.

The number of triggered associations (say M) can be fixed, configured (via RRC), or reported by the UE.

In one example, each or some of N configured port groups of DL RS/UL RSS associations can be triggered via two-part DCI to perform UL RS transmissions and/or DL RS reception/measurement and/or calibration-related information reporting for the calibration. For example, in the first-part DCI, 1-bit indicator is used to indicate whether each the N configured port groups of DL RS/UL RS(s) associations being triggered ('1') or not ('0'). If the first-part DCI indicates each of the associations being triggered, the second-part DCI does not convey any indicator for this (hence may be absent/not provided). If the first-part DCI indicates not all associations being triggered, the second-part DCI conveys an N-bit bitmap indicator, where the N-bit bitmap indicator indicates which port groups of DL RS/UL RS(s) associations are triggered to perform UL RS transmissions and/or DL RS reception/measurement and/or calibration-related information reporting for the calibration.

In one example, the N-bit bitmap indicator can be used to perform UL RS transmissions and DL RS receptions corresponding to triggered port groups of DL RS/UL RSS associations and calibration-related information reporting.

In one example, the N-bit bitmap indicator can be used to perform DL RS receptions corresponding to triggered port groups of DL RS/UL RSs associations and calibration-related information reporting.

In one example, the N-bit bitmap indicator can be used to perform UL RS transmissions and DL RS receptions corresponding to port groups of triggered DL RS/UL RSS associations.

In one example, the N-bit bitmap indicator can be used to perform UL RS transmissions corresponding to triggered port groups of DL RS/UL RSs associations and calibration-related information reporting.

In one example, the N-bit bitmap indicator can be used to perform UL RS transmissions corresponding to triggered port groups of DL RS/UL RSs associations.

In one example, the N-bit bitmap indicator can be used to perform DL RS receptions corresponding to triggered port groups of DL RS/UL RSs.

In one example, the N-bit bitmap indicator can be used to perform calibration-related information reporting corresponding to port groups of triggered DL RSs/UL RSs.

Or the first-part DCI includes the N-bit bitmap. If the bitmap indicates each of the associations being triggered, the second-part DCI does not convey any indicator for this (hence may be absent). If the bitmap indicates not all associations being triggered, the second-part DCI conveys additional information about the triggered association.

Or the first-part DCI includes the value of M (number of triggered associations). If M indicates each of the associations being triggered, the second-part DCI does not convey any indicator for this (hence may be absent). If M indicates not all associations being triggered, the second-part DCI conveys the information about triggered association (e.g., indices, or bitmap or a combinatorial indicator for choosing/selecting M out of N).

In one embodiment, a UE can be configured to periodically or semi-persistently perform UL RS transmissions and/or DL RS reception/measurement and/or calibration-related information reporting for calibration, where port group(s) of DL RS and UL RS(s) are associated/configured in a way according to one or more embodiments described herein. Each or some (a subset) of the configured port group(s) of DL RS/UL RS(s) associations can be configured to periodically or semi-persistently perform UL RS transmissions and/or DL RS reception/measurement and/or calibration-related information reporting for the calibration. For a periodic operation, it can be configured with higher-layer parameters, i.e., RRC parameters. For a semi-persistent operation, activation/deactivation can be configured via DCI or MAC-CE.

In one embodiment, when a UE is configured to perform UL RS transmission, the UE designs matched filter (MF) precoder (or beamformer, precoding vector/matrix, beamforming vector/matrix) that is determined by DL channel measured from an associated port group of DL RS (or associated port groups of DL RS) and applies the precoder for the UL RS transmission.

In one embodiment, when a gNB or NW performs DL RS transmission for a port group (groups), the NW 130 designs matched filter (MF) precoder (or beamformer, precoding vector/matrix, beamforming vector/matrix) that is determined by UL channel measured from the associated UL RS (or associated UL RSs) and applies the precoder for the port group (groups) of the DL RS transmission.

In one embodiment, similar to the extension according to one or more embodiments described herein, DL RS resource and port group of UL RS resource can be a unit for association. Using the association unit with DL RS resource/port group of UL RS resource, one or more embodiments described herein can be applied to this embodiment.

In one embodiment, similar to the extension according to one or more embodiments described herein, port of DL RS resource and port group of UL RS resource can be a unit for association. Using the association unit with port of DL RS resource/port group of UL RS resource, one or more embodiments described herein can be applied to this embodiment.

In one embodiment, similar to the extension according to one or more embodiments described herein, port group of DL RS resource and port of UL RS resource can be a unit for association. Using the association unit with port group of DL RS resource/port of UL RS resource, one or more embodiments described herein can be applied to this embodiment.

In one embodiment, similar to the extension according to one or more embodiments described herein, port group of DL RS resource and port group of UL RS resource can be a unit for association. Using the association unit with port group of DL RS resource/port group of UL RS resource, one or more embodiments described herein can be applied to this embodiment.

In one embodiment, similar to the extension according to one or more embodiments described herein, port of DL RS resource and port of UL RS resource can be a unit for association. Using the association unit with port of DL RS resource/port of UL RS resource, one or more embodiments described herein can be applied to this embodiment.

In one embodiment, similar to the extension according to one or more embodiments described herein, DL RS resource and UL RS resource set can be a unit for association. Using the association unit with DL RS resource/UL RS resource set, one or more embodiments described herein can be applied to this embodiment.

In one embodiment, similar to the extension according to one or more embodiments described herein, DL RS resource set and UL RS resource can be a unit for association. Using the association unit with DL RS resource set/UL RS resource, one or more embodiments described herein can be applied to this embodiment.

In one embodiment, similar to the extension according to one or more embodiments described herein, DL RS resource set and UL RS resource set can be a unit for association. Using the association unit with DL RS resource set/UL RS resource set, one or more embodiments described herein can be applied to this embodiment In one embodiment, a UE is configured to perform calibration-related information reporting, where the calibration-related information includes calibration coefficients and/or an indicator indicating a reference index(-ices). In one example, an association mechanism (e.g., N associations between DL RS/UL RS, port group DL RS/UL RS, . . . , etc) according to one or more embodiments described herein can be used/applied/configured for calibration-related information reporting. In another example, N DL RS (e.g., CSI-RS) resources can be configured by higher-layer, MAC-CE, or DCI signaling. In another example, N port groups of a DL RS (e.g., CSI-RS) resource can be configured by higher-layer, MAC-CE, or DCI signaling.

In one example, N phase values are included in the calibration-related information reporting.

In one example, an indicator indicating a reference resource/port group/port/association index is included and N−1 phase values are included in the calibration-related information reporting, where the reference index is determined by the UE. In one example, the N−1 phase values are determined (e.g., relative phase) based on the phase coefficient corresponding to the reference index, (i.e., the coefficient reference index is set to 1, hence not reported).

In one example, N−1 phase values are included in the calibration-related information reporting, where a reference resource/port group/port/association index is configured by the NW 130 or predetermined with a rule. In one example, the N−1 phase values are determined (e.g., relative phase) based on the phase coefficient corresponding to the reference index (i.e., the coefficient reference index is set to 1, hence not reported).

In one example, N phase/amplitude values are included in the calibration-related information reporting.

In one example, an indicator indicating a reference resource/port group/port/association index is included and N−1 phase/amplitude values are included in the calibration-related information reporting, where the reference index is determined by the UE. In one example, the N−1 phase/amplitude values are determined (e.g., relative phase/amplitude) based on the phase/amplitude coefficient corresponding to the reference index (i.e., the coefficient reference index is set to 1, hence not reported).

In one example, N−1 phase/amplitude values are included in the calibration-related information reporting, where a reference resource/port group/port/association index is configured by the NW 130 or predetermined with a rule. In one example, the N−1 phase/amplitude values are determined (e.g., relative phase/amplitude) based on the phase coefficient corresponding to the reference index (i.e., the coefficient reference index is set to 1, hence not reported).

In one example, N phase/power (square of the amplitude) values are included in the calibration-related information reporting.

In one example, an indicator indicating a reference resource/port group/port/association index is included and N−1 phase/power values are included in the calibration-related information reporting, where the reference index is determined by the UE. In one example, the N−1 phase/power values are determined (e.g., relative phase/power) based on the phase/power coefficient corresponding to the reference index (i.e., the coefficient reference index is set to 1, hence not reported).

In one example, N−1 phase/power values are included in the calibration-related information reporting, where a reference resource/port group/port/association index is configured by the NW 130 or predetermined with a rule. In one example, the N−1 phase/power values are determined (e.g., relative phase/power) based on the phase coefficient corresponding to the reference index (i.e., the coefficient reference index is set to 1, hence not reported).

In one example, coefficients described herein can be reported in a subband level or wideband level or any other granularity level, e.g., resource element (RE)/physical resource block (PRB)/subcarrier. The resource indices (e.g., subband indices or number of subbands) corresponding to the coefficients to be reported for calibration can be configured.

In one embodiment, calibration coefficients are reported to the NW 130 using codebooks. For example, the phase and amplitude (power) coefficients can be quantized according to respective codebooks.

In one example, the codebook for the phase coefficient can be designed similar to the codebook for the phase coefficient in Rel-15/16/17 Type-II CSI codebook, e.g., 8-PSK (3-bit per phase), 16-PSK (4-bit per phase), or 256-PSK (8-bit per phase). Since a calibration process requires high accuracy, high-resolution quantized codebook can be demanded such as 256-PSK. In one example, the codebook for the phase coefficient can be configured by higher-layer signaling or MAC-CE or DCI signaling, from 8PSK(3-bit per phase to 256PSK (8-bit per phase). In another example X-PSK codebook can be used for the phase coefficient, where X=2, 3, 4, 5, 6, 7, . . . .

In one example, the codebook for the amplitude coefficient is designed similar to the codebook for the amplitude coefficient in Rel-15/16/17 Type-II CSI codebook. e.g., 3-bit or 4-bit amplitude codebook. An example is shown as follows:

| 4-bit amplitude codebook | |
|---|---|
| Index | Amplitude |
| 0 | 0 |
| 1 | $\dfrac{1}{\sqrt{128}}$ |
| 2 | $\left(\dfrac{1}{8192}\right)^{1/4}$ |
| 3 | $\dfrac{1}{8}$ |
| 4 | $\left(\dfrac{1}{2048}\right)^{1/4}$ |
| 5 | $\dfrac{1}{2\sqrt{8}}$ |
| 6 | $\left(\dfrac{1}{512}\right)^{1/4}$ |
| 7 | $\dfrac{1}{4}$ |
| 8 | $\left(\dfrac{1}{128}\right)^{1/4}$ |
| 9 | $\dfrac{1}{\sqrt{8}}$ |
| 10 | $\left(\dfrac{1}{32}\right)^{1/4}$ |
| 11 | $\dfrac{1}{2}$ |
| 12 | $\left(\dfrac{1}{8}\right)^{1/4}$ |
| 13 | $\dfrac{1}{\sqrt{2}}$ |
| 14 | $\left(\dfrac{1}{2}\right)^{1/4}$ |
| 15 | 1 |

| 3-bit amplitude codebook | |
|---|---|
| Index | Amplitude |
| 0 | 0 |
| 1 | $\dfrac{1}{8}$ |

-continued

| 3-bit amplitude codebook | |
| --- | --- |
| Index | Amplitude |
| 2 | $\dfrac{1}{4\sqrt{2}}$ |
| 3 | $\dfrac{1}{4}$ |
| 4 | $\dfrac{1}{2\sqrt{2}}$ |
| 5 | $\dfrac{1}{2}$ |
| 6 | $\dfrac{1}{\sqrt{2}}$ |
| 7 | 1 |

In one example, the codebook for the amplitude coefficient contains elements whose values are larger than 1. Note that the amplitude coefficient for calibration is not guaranteed to be smaller than 1, e.g., when a reference value is not determined. An example for the case of 4-bit codebook is shown as follows:

| 4-bit amplitude codebook | |
| --- | --- |
| Index | Amplitude |
| 0 | 0 |
| 1 | $\dfrac{2}{\sqrt{128}}$ |
| 2 | $2\left(\dfrac{1}{8192}\right)^{1/4}$ |
| 3 | $\dfrac{1}{4}$ |
| 4 | $2\left(\dfrac{1}{2048}\right)^{1/4}$ |
| 5 | $\dfrac{1}{\sqrt{8}}$ |
| 6 | $2\left(\dfrac{1}{512}\right)^{1/4}$ |
| 7 | $\dfrac{1}{2}$ |
| 8 | $2\left(\dfrac{1}{128}\right)^{1/4}$ |
| 9 | $\dfrac{2}{\sqrt{8}}$ |
| 10 | $2\left(\dfrac{1}{32}\right)^{1/4}$ |
| 11 | 1 |
| 12 | $2\left(\dfrac{1}{8}\right)^{1/4}$ |

-continued

| 4-bit amplitude codebook | |
| --- | --- |
| Index | Amplitude |
| 13 | $\dfrac{2}{\sqrt{2}}$ |
| 14 | $2\left(\dfrac{1}{2}\right)^{1/4}$ |
| 15 | 2 |

In one example, the codebook for the power value can be a 3-bit or 4-bit amplitude codebook. An example is the square of the amplitude designed in relevant example(s) herein.

In one example, the codebook for the power value contains elements whose values are larger than 1. Note that the power value for calibration is not guaranteed to be smaller than 1, e.g., when a reference value is not determined.

In one embodiment, calibration-related information reporting can be designed based on at least one of the existing N-port DL codebooks specified in Rel-15/16/17/18 CSI Type-I/II. For example, associations described in an example of embodiment I can be linked to N-port DL codebooks.

In one example, N port groups of DL RS (associated with e.g., a UL RS or UL RSs, etc) can be linked to the N-port for the N-port DL codebook.

In one example, N DL RS (associated with e.g., a UL RS or UR RSs, etc) can be linked to the N-port for the N-port DL codebook.

In one embodiment, a UE can initiate a calibration operation, e.g., one of the operations according to one or more embodiments described herein by transmitting UCI or UL MAC-CE, similar to scheduling request (SR).

Figure 29:
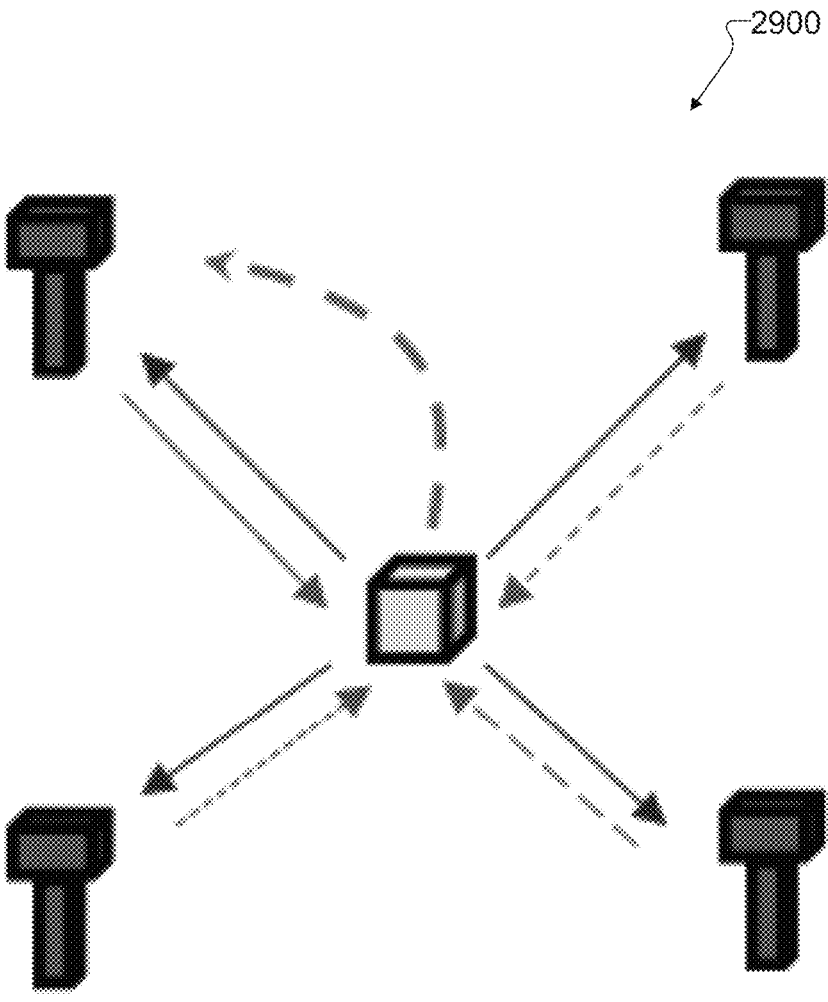
FIG. 29 illustrates a diagram of calibration across multiple TRPs according to embodiments of the present disclosure.

FIG. 29 illustrates a diagram 2900 of calibration across multiple TRPs according to embodiments of the present disclosure. For example, in diagram 2900 the DL RS can be received by the UE 116 of FIG. 3 and the UL RS can be received by the gNB 102 of FIG. 1. This example is for illustration only and other embodiments can be used without departing from the scope of the present disclosure.

In one embodiment, calibration across multiple TRPs (to align TDD uplink-downlink reciprocity) can be done using at least one of embodiments/examples described herein. With reference to FIG. 29, calibration via many-to-one associations is shown.

Any of the above variation embodiments can be utilized independently or in combination with at least one other variation embodiment. The above flowchart illustrates example methods that can be implemented in accordance with the principles of the present disclosure and various changes could be made to the methods illustrated in the flowchart herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:

a processor; and a transceiver operably coupled to the processor, the transceiver configured to:

receive, from a base station, a radio resource control (RRC) signaling configuring a channel state information (CSI) report, wherein the RRC signaling comprises first information on an associated sounding reference signal (SRS) resource for a CSI reference signal (CSI-RS) resource set and wherein the associated SRS resource is for a coherent joint transmission calibration (CJTC) for phase; and transmit, to the base station, the CSI report.

2. The UE of claim 1, wherein an SRS resource set including the associated SRS resource is configured with a usage set to an antenna switching.

3. The UE of claim 1, wherein the RRC signaling further comprises second information configuring a plurality of single-port CSI-RS resources for the CSI-RS resource set.

4. The UE of claim 1, wherein the associated SRS resource is configured as aperiodic, semi-persistent, or periodic.

5. The UE of claim 1, wherein:

the CSI report includes phase offset values for each CSI-RS resource relative to a reference CSI-RS resource, and the phase offset values are reported on a wideband basis or for subbands indicated by a parameter that corresponds to a number of subbands.

6. A base station (BS) comprising:

a processor; and a transceiver operably coupled to the processor, the transceiver configured to:

transmit, to a user equipment (UE), a radio resource control (RRC) signaling configuring a channel state information (CSI) report, wherein the RRC signaling comprises first information on an associated sounding reference signal (SRS) resource for a CSI reference signal (CSI-RS) resource set and wherein the associated SRS resource is for a coherent joint transmission calibration (CJTC) for phase; and receive, from the UE, the CSI report.

7. The BS of claim 6, wherein an SRS resource set including the associated SRS resource is configured with a usage set to an antenna switching.

8. The BS of claim 6, wherein the RRC signaling further comprises second information configuring a plurality of single-port CSI-RS resources for the CSI-RS resource set.

9. The BS of claim 6, wherein the associated SRS resource is configured as aperiodic, semi-persistent, or periodic.

10. The BS of claim 6, wherein:

the CSI report includes phase offset values for each CSI-RS resource relative to a reference CSI-RS resource, and the phase offset values are reported on a wideband basis or for subbands indicated by a parameter that corresponds to a number of subbands.

11. A method performed by a user equipment (UE), the method comprising:

receiving, from a base station, a radio resource control (RRC) signaling configuring a channel state information (CSI) report, wherein the RRC signaling comprises first information on an associated sounding reference signal (SRS) resource for a CSI reference signal (CSI-RS) resource set and wherein the associated SRS resource is for a coherent joint transmission calibration (CJTC) for phase; and transmitting to the base station, the CSI report.

12. The method of claim 11, wherein an SRS resource set including the associated SRS resource is configured with a usage set to an antenna switching.

13. The method of claim 11, wherein the RRC signaling further comprises second information configuring a plurality of single-port CSI-RS resources for the CSI-RS resource set.

14. The method of claim 11, wherein the associated SRS resource is configured as aperiodic, semi-persistent, or periodic.

15. The method of claim 11, wherein:

the CSI report includes phase offset values for each CSI-RS resource relative to a reference CSI-RS resource, and the phase offset values are reported on a wideband basis or for subbands indicated by a parameter that corresponds to a number of subbands.

* * * * *